(12) United States Patent
Yoshida

(10) Patent No.: US 7,287,150 B2
(45) Date of Patent: Oct. 23, 2007

(54) PROCESSOR AND INSTRUCTION CONTROL METHOD

(75) Inventor: Toshio Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 432 days.

(21) Appl. No.: 10/347,337

(22) Filed: Jan. 21, 2003

(65) Prior Publication Data
US 2004/0006685 A1    Jan. 8, 2004

(30) Foreign Application Priority Data
Jul. 5, 2002    (JP) ............................. 2002-197304

(51) Int. Cl.
*G06F 9/30* (2006.01)
(52) U.S. Cl. ..................... 712/217; 712/216
(58) Field of Classification Search ................ 712/216, 712/217
See application file for complete search history.

(56) References Cited

U.S. PATENT DOCUMENTS 5,996,063 A * 11/1999 Gaertner et al. ............ 712/215
6,266,744 B1 * 7/2001 Hughes et al. .............. 711/146

FOREIGN PATENT DOCUMENTS

| JP | 59123937 A | 7/1984 |
|---|---|---|
| JP | 02148221 A | 7/1990 |
| JP | 07-253888 | 10/1995 |
| JP | 2000-181702 | 6/2000 |

OTHER PUBLICATIONS

"Lecture 5: Tomasulo Algorithm (I) Execution correctness, data dependence, instruction window, Tomasulo algorithm overview" © 1998.*
"Lecture 6: Tomasulo Algorithm (II) Explanations of each stages, A big example" © 1998.*

* cited by examiner

*Primary Examiner*—Eddie Chan
*Assistant Examiner*—Aimee J Li
(74) *Attorney, Agent, or Firm*—Staas & Halsey LLP

(57) ABSTRACT

When a predetermined instruction is fetched and decoded, an instruction issuing unit develops the instruction operation into a multiflow of a previous flow and a following flow and issues the instruction by in-order. It is held into a reservation station. An instruction executing unit executes the instruction held in the reservation station by out-of-order. Further, an execution result of the instruction is committed by in-order. A multiflow guarantee processing unit guarantees an execution result of the previous flow stored in an allocation register on a register update buffer until the following flow is committed. Even if the previous flow is committed and the allocation register is released, the guaranteeing process is realized by stalling another instruction serving as a next register allocation destination in a decoding cycle until the following flow is committed.

15 Claims, 20 Drawing Sheets

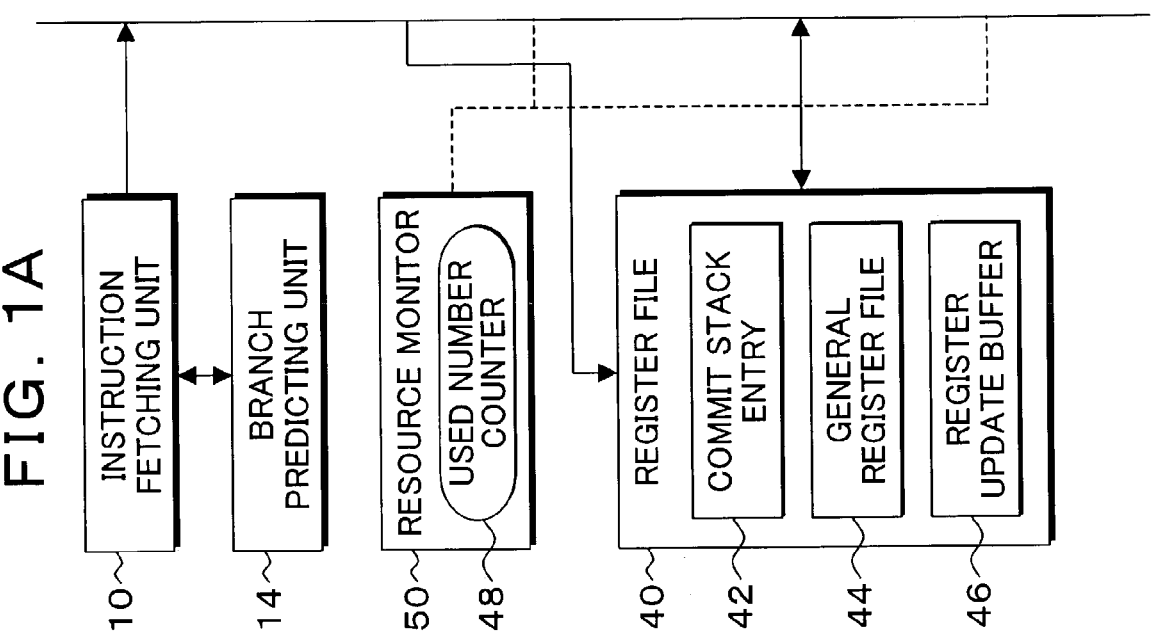

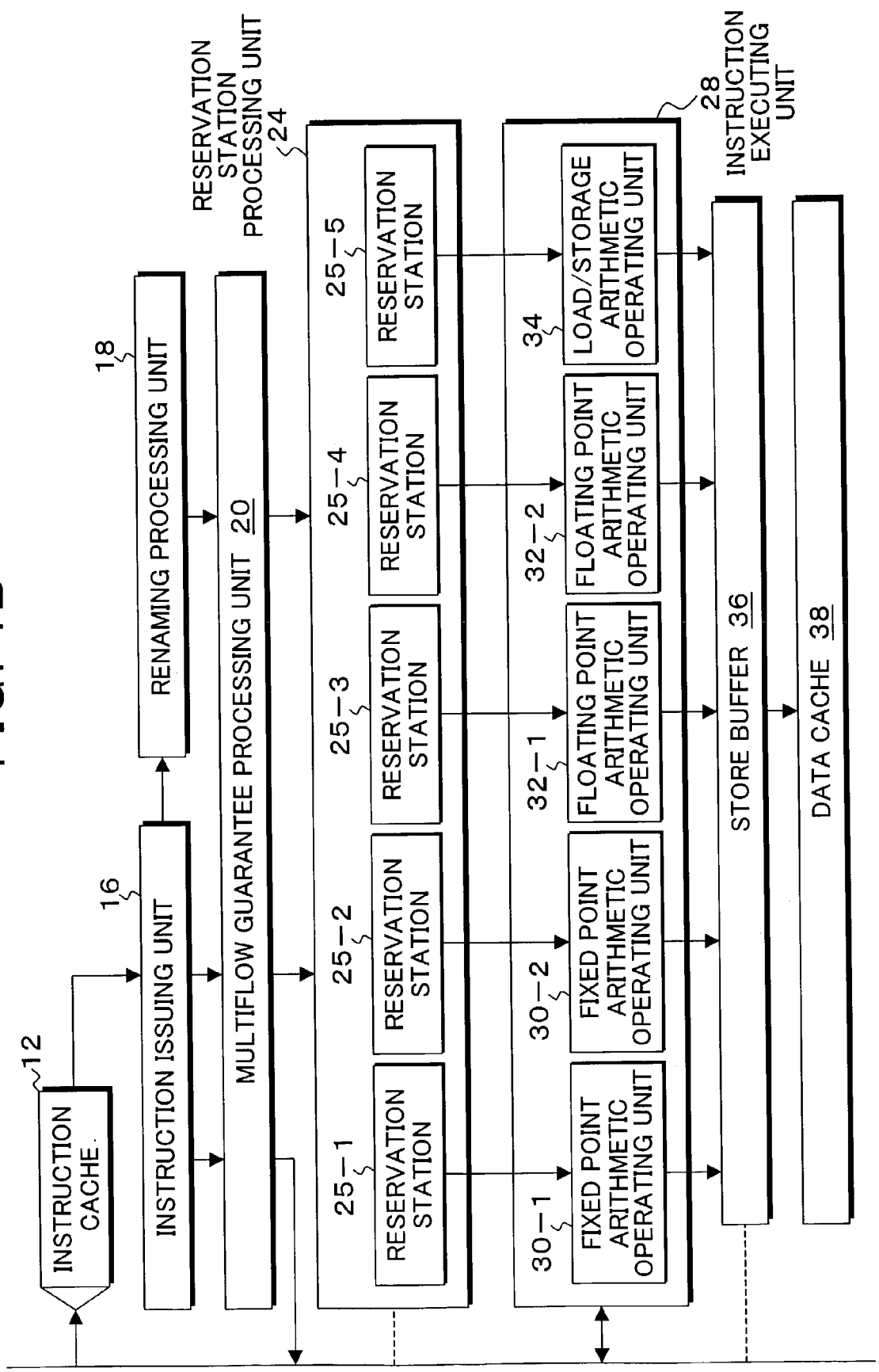

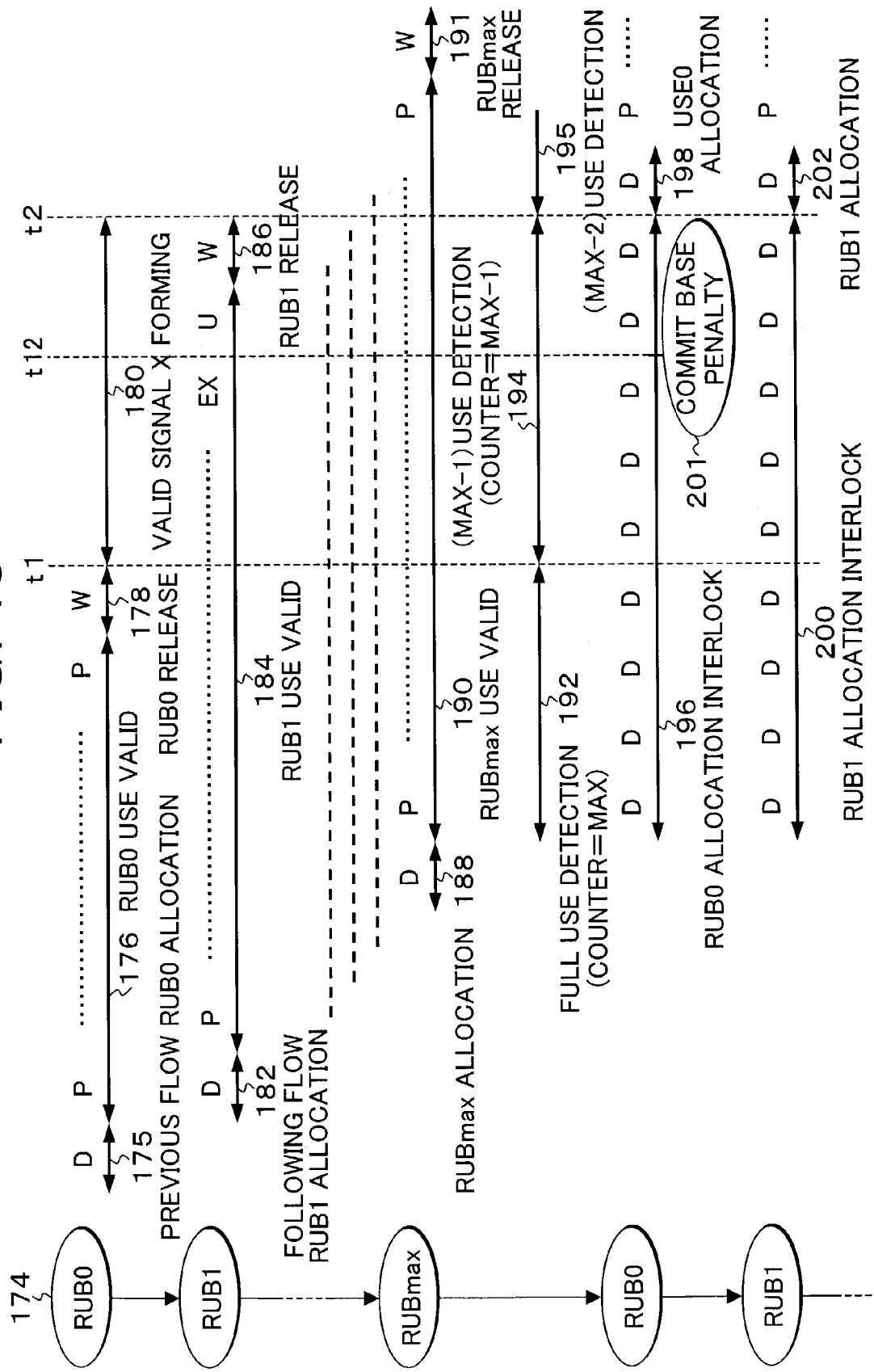

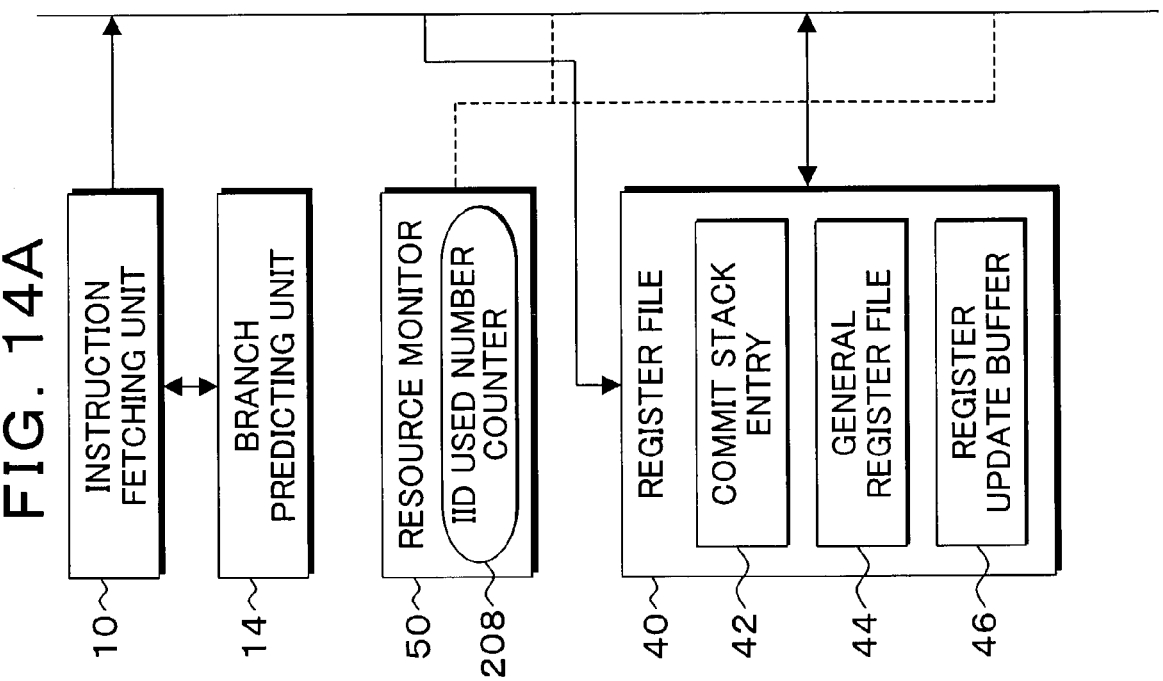

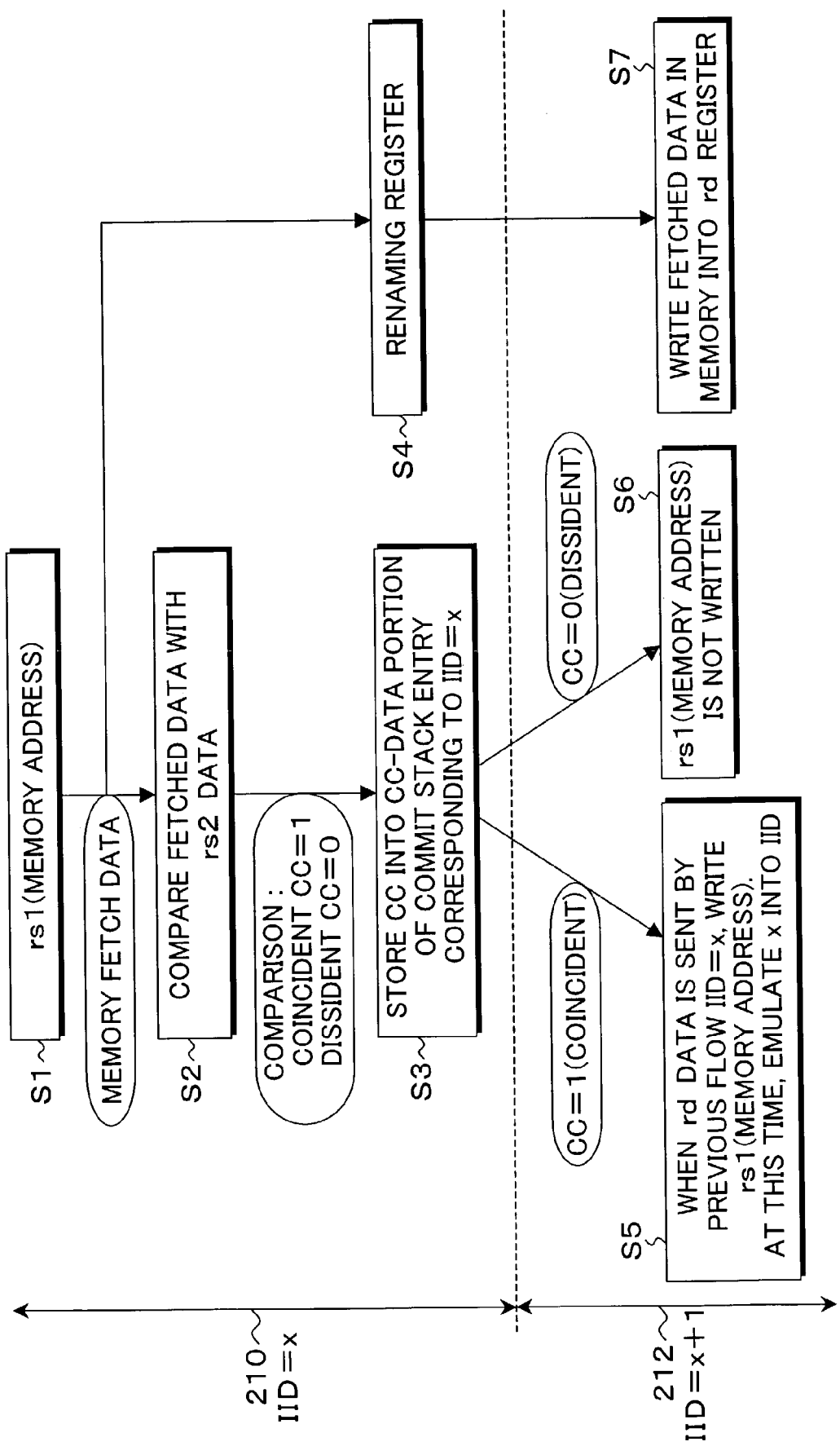

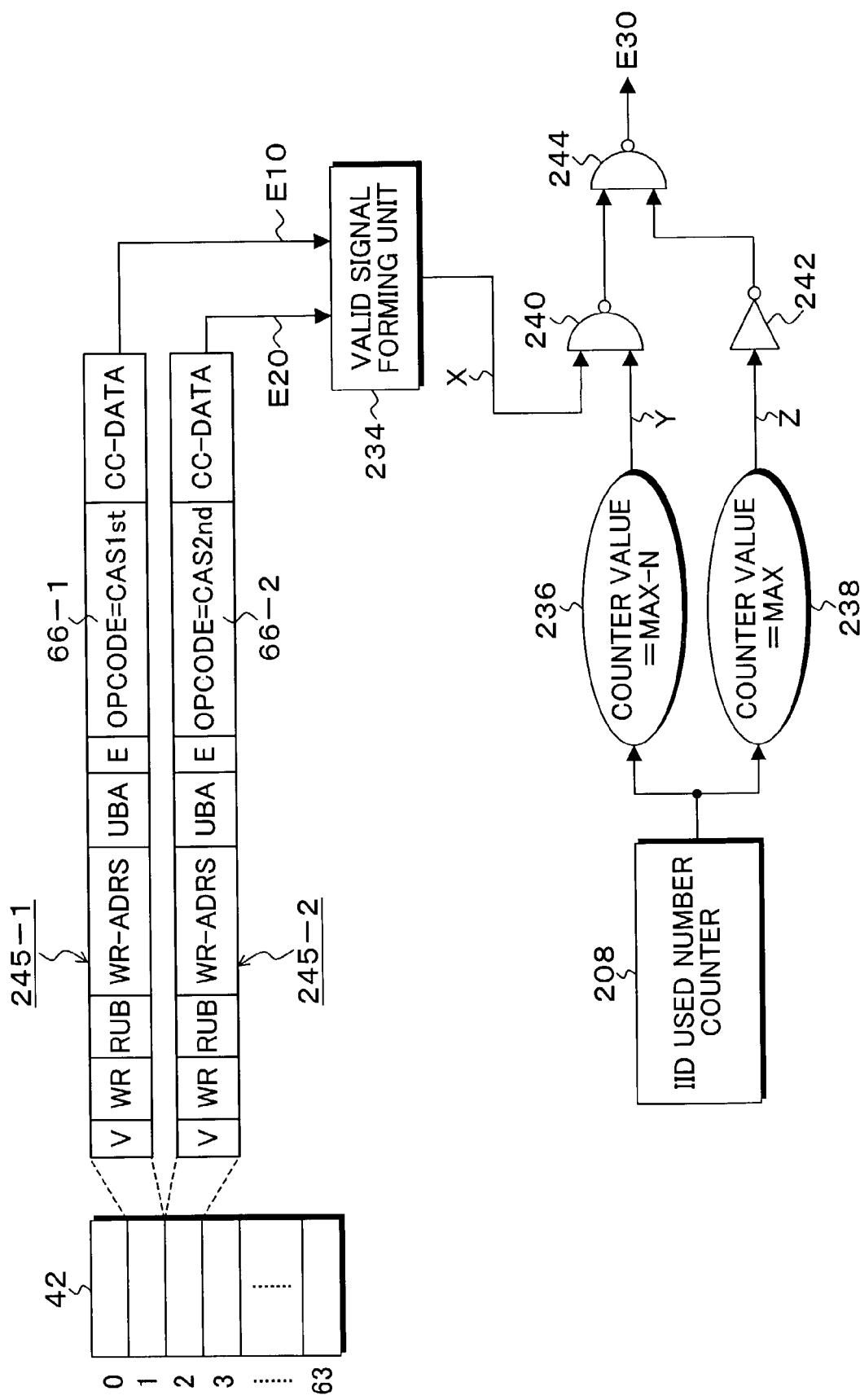

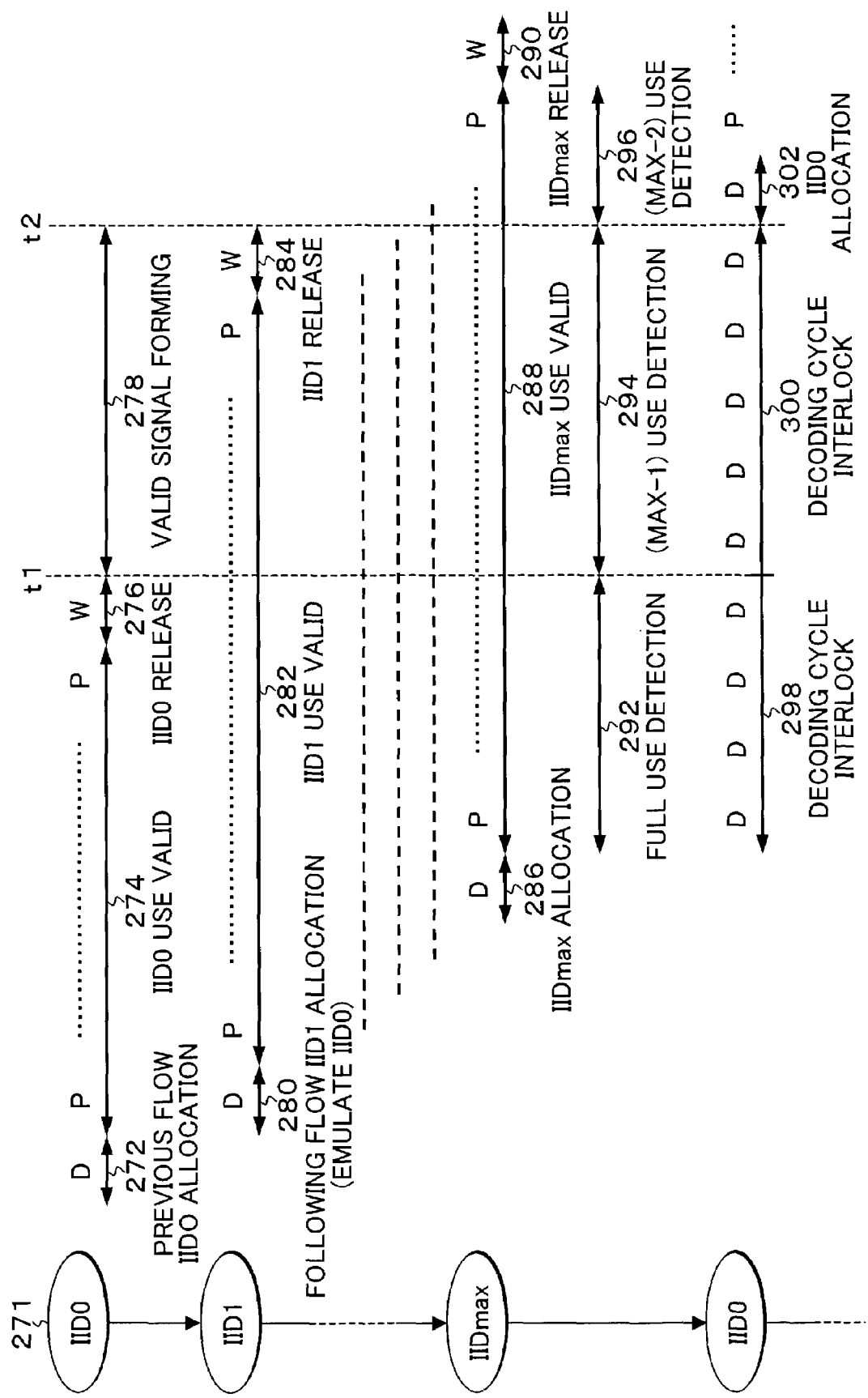

PROCESSOR AND INSTRUCTION CONTROL METHOD

BACKGROUND OF THE INVENTION

1. Field of the Invention

The invention relates to a processor and an instruction control method of performing instruction control for holding information of a previous instruction until a following instruction is committed. More particularly, the invention relates to a processor and an instruction control method of performing instruction control for developing an instruction to a multiflow and forwarding information of a previous flow to a following flow.

2. Description of the Related Arts

Hitherto, in a processor for executing dynamic pipeline scheduling, processes are separately executed by three units: an instruction issuing unit of in-order depending on program order; an instruction executing unit of out-of-order which does not depend on the program order; and a committing unit of the in-order depending on the program order. That is, the instruction issuing unit fetches instructions by the in-order, decodes them, and allows a reservation station to hold the instruction operation (OP code) and an operand. As soon as all operands are prepared in the reservation station and an arithmetic operating unit is made usable, the instruction executing unit speculatively executes the instruction by the out-of-order and obtains a result. The committing unit discriminates commitment of the instruction on the basis of a branch prediction result or the like, completes the instruction by the in-order, and stores the execution result into a register file or a memory (only in the case of storage). In the processor using such dynamic pipeline scheduling, although a frequency is low in the program, there is an instruction kind which has to be internally multiflow developed into a plurality of instruction flows in a decoding cycle of the fetched instruction. For example, in an SPARC instruction architecture, a pixel distance instruction corresponds to such an instruction. The pixel distance instruction is an instruction to divide a pixel value of 64 bits stored in each of source registers R1 and R2 on an 8-bit unit basis, calculate differences between the values in both registers, and thereafter, obtain the sum of the differences. The pixel distance instruction is developed into a multiflow comprising a previous flow for executing a subtracting operation and a following flow for executing an adding operation in the decoding cycle, stored into the reservation station, and thereafter, the subtracting operation of the previous flow is executed by the out-of-order. An execution result is forwarded before executing the instruction of the following flow, an adding operation is executed, and an obtained result is committed. In the case of forwarding information of the previous flow to the following flow, a dedicated hardware register for holding the execution information of the previous flow has conventionally been provided.

However, if the dedicated hardware register is provided for the forward control in the multiflow of the instruction of the low frequency, it is wasteful in terms of resources. Therefore, a method whereby a register on a register update buffer (RUB) which is provided for renaming is allocated without providing the dedicated hardware register is considered. In the processor using the out-of-order, a register renaming technique has been known as a method whereby register contents are updated and referred to in the program order. The register renaming is a process such that a register on the register update buffer for holding register update data until the commitment is allocated to an arithmetic operation instruction for updating the register and a memory fetch instruction. At this time, information showing that an allocation register of the register update buffer is being updated and pending and an allocation address of the register update buffer are held in a renaming map. According to the following instruction, with reference to the address on the register update buffer corresponding to a source register of the renaming map by the address of the register serving as a reading source, when the register update is pending, the data forward is controlled by the update buffer allocation address. However, since the allocation register on the register update buffer is released by the commitment of the instruction, when there is an empty time in an interval from the commitment of the previous flow to the execution of the following flow, there is a possibility that the allocation register is broken by another subsequent instruction. There is, consequently, a problem such that the forward control for the following flow is not guaranteed.

A similar problem is also caused with respect to an instruction ID of the multiflow in a compare and swap instruction of the SPARC instruction architecture.

The compare and swap instruction is described as cas [rs1], rs2, rd and has an instruction operation such that a value of a memory is loaded by using a source register rs1 as an address and written into a destination register rd, such a value is compared with a value of a source register rs2, and if they coincide, the original destination register rd is stored into a memory whose address is equal to rs1, and if they do not coincide, the original destination register rd is not stored into the memory. The compare and swap instruction is developed into the multiflow comprising a loading of the previous flow, a comparing operation, and a store operation of the following flow into the memory. For example, if IID=x is allocated as an instruction ID to the previous flow, although an instruction ID=X +1 which has been increased by one is inherently allocated to the following flow, the instruction ID is emulated to the same instruction ID=x as that in the first flow without executing such allocation. The emulation of the instruction ID is executed to enable different entries of the incomplete previous flow and following flow stacked to a commit stack entry to be referred to as a same entry by the instruction ID=x. Thus, it is possible to control in a manner such that by referring to the comparison result held in the previous flow entry by the instruction ID=x which has been allocated to the following flow and emulated just before the execution of the following flow, if they coincide, the store operation into the memory is executed and, if they do not coincide, the result is abandoned. However, since the commit stack entry is released by the commitment of the instruction, if there is an empty time in the interval from the commitment of the previous flow to the execution of the following flow, there is a possibility that the commit stack entry of the previous flow is broken by another subsequent instruction. There is, consequently, a problem such that the emulation control for the following flow is not guaranteed.

SUMMARY OF THE INVENTION

According to the invention, a processor and an instruction control method of performing instruction control for guaranteeing that information of a previous flow is not broken until a following flow is committed are provided.

(Guarantee of Execution Information of Previous Flow)

A processor of the invention performs instruction control for holding an execution result of a previous flow so that it is not broken until a following flow is committed without providing a dedicated hardware register for storing the execution result of the previous flow. For this purpose, according to the invention, there is provided a processor comprising: an instruction issuing unit which, when a predetermined instruction is fetched and decoded, develops an instruction operation into a multiflow of a previous flow and a following flow and issues the instruction by in-order; a reservation station which holds the issued instruction; an instruction executing unit which executes the instruction held in the reservation station by out-of-order; a committing unit which discriminates a commitment of the instruction executed by the instruction executing unit and completes it by the in-order; and a multiflow guarantee processing unit which guarantees an execution result of the previous flow by the instruction executing unit until the following flow is committed after the previous flow was committed. Therefore, the execution result of the previous flow is held until the following flow is committed. It is guaranteed to certainly forward the information of the previous flow to the following flow.

The processor of the invention further has a renaming processing unit which renames a register that is used by a plurality of instructions having a dependent relation, allocates it onto a register update buffer, and releases the register allocated onto the register update buffer in accordance with the commitment of the execution result by the instruction, in this case, the multiflow guarantee processing unit does not rename a register that is used by the previous flow and the following flow having the dependent relation by the renaming processing unit upon decoding of the previous flow, but allocates a dedicated register onto the register update buffer and inhibits the release of the dedicated register until the following flow is committed. Since the dedicated register of the multiflow is allocated by using register resources used for renaming as mentioned above, there is no need to additionally provide dedicated register resources for the multiflow. A construction of the processor is simplified and the resources can be saved.

Specifically speaking, the multiflow guarantee processing unit comprises: a valid signal forming unit which outputs a valid signal (X) that is turned on for a period of time from the commitment of the previous flow to the commitment of the following flow; a counter value discriminating unit which detects that a counter for counting the number of used registers on the register update buffer indicates a counter value (MAX−N) obtained by subtracting the number of flows (N) from a maximum value MAX, and outputs a counter value discrimination signal (Y) that is turned on in response to such detection; a buffer-full detecting unit which detects that the counter indicates the maximum value, and outputs a buffer-full signal (Z) that is turned on in response to such detection; and a logic arithmetic operating unit which forms a logic signal indicative of an OR [(X and Y) or Z] of a result of an AND (X and Y) of the valid signal (X) and the counter value discrimination signal (Y) and the buffer-full signal (Z) and stalls the decoding cycle in the instruction issuing unit while the logic signal is ON. The instruction executing unit stores the execution result of the previous flow into a dedicated register allocated onto the register update buffer and forwards a value of the dedicated register at the start of the execution of the following flow.

According to the invention, there is provided an instruction control method of a processor. This instruction control method comprises: an instruction issuing step wherein, when a predetermined instruction is fetched and decoded, an instruction operation is developed into a multiflow of a previous flow and a following flow and the instruction is issued by in-order;

an instruction holding step wherein the issued instruction is held into a reservation station;

an instruction executing step wherein the instruction held in the reservation station is executed by out-of-order;

a committing step wherein a commitment of the executed instruction is discriminated and completed by the in-order; and a multiflow guaranteeing step wherein an execution result of the instruction executing step is guaranteed until the following flow is committed after the previous flow was committed. Details of the instruction control method are fundamentally the same as those in the case of the processor.

(Guarantee of Previous Flow Instruction ID)

A processor of the invention performs instruction control for holding an instruction identifier (IID) of a previous flow so that it is not broken until a following flow is executed without providing a dedicated hardware register. According to the invention, there is provided a processor comprising: an instruction issuing unit which, when a predetermined instruction is fetched and decoded, develops an instruction operation into a multiflow of a previous flow and a following flow, adds a unique instruction identifier every instruction flow, and issues the instruction by in-order; a reservation station which holds the issued instruction; an instruction executing unit which executes the instruction held in the reservation station by out-of-order; a committing unit which discriminates a commitment of the instruction executed by the instruction executing unit and completes it by the in-order; and a multiflow guarantee processing unit which guarantees the instruction identifier of the previous flow until the following flow is committed. Therefore, the instruction identifier of the previous flow is held until the following flow is committed. Commit stack entry information of the previous flow in a commit waiting state is certainly reflected to the instruction operation of the following flow, and the forward control is guaranteed.

The instruction issuing unit emulates the instruction identifier allocated to the following flow to the same instruction identifier as that of the previous flow, and at the start of the instruction operation of the following flow, enables an execution result of the previous flow to be referred to by the emulated instruction identifier. The multiflow guarantee processing unit comprises: a valid signal forming unit which outputs a valid signal (X) that is turned on for a period of time from a commitment of the previous flow to the commitment of the following flow; a counter value discriminating unit which detects that a counter for counting the number of used instruction identifiers indicates a counter value (MAX−N) obtained by subtracting the number of flows (N) from a maximum value MAX, and outputs a counter value discrimination signal (Y) that is turned on in response to such detection; a buffer-full detecting unit which detects that the counter indicates the maximum value, and outputs a buffer-full signal (Z) that is turned on in response to such detection; and a logic arithmetic operating unit which forms a logic signal indicative of an OR [(X and Y) or Z] of a result of an AND (X and Y) of the valid signal (X) and the counter value discrimination signal (Y) and the buffer-full signal (Z) and stalls the decoding cycle in the instruction issuing unit while the logic signal is ON. The instruction executing unit stores state code data obtained as an execution result of the previous flow into a commit stack entry of the previous flow, upon decoding of the following flow, selectively executes the instruction operation of the following flow with reference to the state code data in the commit stack entry of the previous flow.

According to the invention, there is provided an instruction control method of a processor. This instruction control method comprises: an instruction issuing step wherein, when a predetermined instruction is fetched and decoded, an instruction operation is developed into a multiflow of a previous flow and a following flow, a unique instruction identifier is added every instruction flow, and the instruction is issued by in-order; a holding step wherein the issued instruction is held into a reservation station; an instruction executing step wherein the instruction held in the reservation station is executed by out-of-order; a committing step wherein a commitment of the instruction executed in the instruction executing step is discriminated and completed by the in-order; and a multiflow guaranteeing step wherein the instruction identifier of the previous flow is guaranteed until an execution result of the following flow is committed. Details of the instruction control method are fundamentally the same as those in the case of the processor.

The above and other objects, features, and advantages of the present invention will become more apparent from the following detailed description with reference to the drawings.

BRIEF DESCRIPTION OF THE DRAWINGS

FIGS. 1A and 1B are block diagrams of a functional construction of a processor according to the invention in which a register update buffer allocation is executed by multiflow instruction control;

FIG. 13 is a time chart for allocation of the register update buffer in the instruction execution of a multiflow according to the invention and the forming state of the signal in each section in FIG. 11;

FIGS. 14A and 14B are block diagrams of a functional construction of a processor according to the invention in which an instruction identifier is allocated by multiflow instruction control;

FIG. 15 is an explanatory diagram of the instruction operation according to a multiflow of a compare and swap instruction serving as an instruction control target in FIGS. 14A and 14B;

FIG. 16 is an explanatory diagram of an embodiment of a multiflow guarantee processing unit in FIG. 15 in which an instruction identifier of a previous flow is guaranteed until a commitment of a following flow;

FIG. 18 is a time chart for allocation of instruction identifiers in an instruction execution of a multiflow in the invention and a forming state of a signal in each section in FIG. 16.

DETAILED DESCRIPTION OF THE PREFERRED EMBODIMENT

Figure 2:
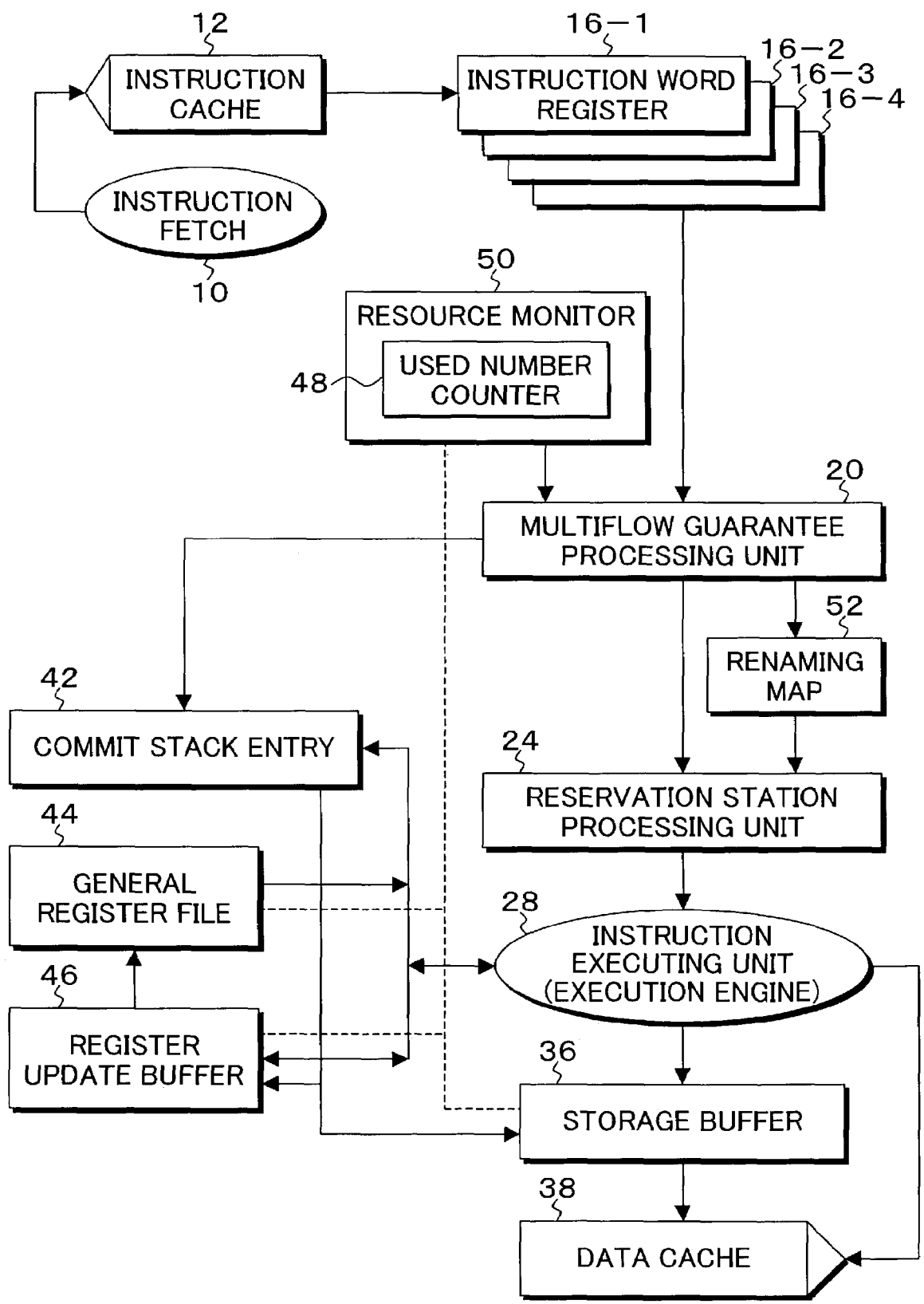
FIG. 2 is a block diagram of processing functions according to the invention mainly with respect to renaming in FIGS. 1A and 1B.

FIGS. 1A and 1B are block diagrams of a functional construction of a processor having instruction issuing control of the invention. The processor comprises: an instruction fetching unit 10; a branch predicting unit 14; an instruction cache 12; an instruction issuing unit 16; a renaming processing unit 18; a multiflow guarantee processing unit 20; a reservation station processing unit 24 having reservation stations 25-1 to 25-5; an instruction executing unit 28 having fixed point arithmetic operating units 30-1 and 30-2, floating point arithmetic operating units 32-1 and 32-2, and a load/storage arithmetic operating unit 34; a store buffer 36; a data cache 38; a register file 40; and a resource monitor 50. The component elements 20, 24, 28, 36, 38, 40, and 50 are the component elements newly provided in accordance with the invention. The register file 40 has: a commit stack entry 42; a general register file 44 known as an architecture register file; and a register update buffer 46 which becomes a target of register allocation of a register renaming process. The instruction cache 12 and the data cache 38 are connected to a memory from an interface (not shown) corresponding to an SPARC port architecture via a system controller.

FIG. 2 is a block diagram of processing functions according to the invention mainly with respect to renaming in accordance with an embodiment of the processor of FIGS. 1A and 1B. A fundamental processing procedure of the processor of the invention for executing dynamic pipeline scheduling will be described as follows. The instruction fetching unit 10 fetches, for example, four instructions in the lump into instruction word registers 16-1 to 16-4 from a queue on the instruction cache 12 side and decodes them. The decoded four instructions are sent to the reservation station processing unit 24. The reservation station processing unit 24 has the five reservation stations 25-1 to 25-5 as shown in FIGS. 1A and 1B for the purpose of executing arithmetic operations and stores the instructions into the reservation stations having empty spaces with a predetermined relation. For example, each of the reservation stations 25-1 to 25-5 in FIGS. 1A and 1B has eight entries, so that a total of 40 arithmetic operating instructions can be reserved. The storage of the instructions into the reservation station processing unit 24 is executed by in-order according to the order of programs. Simultaneously with that the instructions are inputted to the reservation station processing unit 24, an entry is also allocated every instruction to the commit stack entry 42 and held until it is released by the commitment of the instruction. In the embodiment, the commit stack entry 42 has 64 entries. Therefore, if the corresponding reservation station in the reservation station processing unit 24, the commit stack entry 42, and the entry which can be used for resources (a register update buffer, a store buffer, etc.) necessary for executing the instruction do not exist, the instructions are not issued from the instruction word registers 16-1 to 16-4, but the instructions are stalled in a decoding cycle. If all operands of the instructions are prepared in the corresponding reservation station in the reservation station processing unit 24 and the corresponding arithmetic operating unit is made usable, the instruction executing unit 28 which functions as an instruction engine immediately executes the instruction operation, so that an execution result is obtained. The operation to execute the instructions in the instruction executing unit 28 is not always executed in order of the programs, but is executed by out-of-order in which the instructions are successively and speculatively executed from the executable instruction. By receiving a discrimination result such as establishment of a branch or the like, the instruction is committed and the execution result of the instruction executing unit 28 is stored into the store buffer 36. After that, in the case of a storing instruction, it is stored into the data cache 38 and the instruction is completed by the in-order. In the case of the other arithmetic operating instruction, it is further stored into the corresponding register in the general register file 44 and the instruction is completed by the in-order. When the instruction is committed as mentioned above, the allocation entry in the commit stack entry 42 is released. According to the processor of the invention, the instruction operation is executed by the out-of-order in the instruction executing unit 28, and since the instructions are not executed in order of the program, a dedicated register for holding information has to be allocated every instruction. In the case of FIG. 2, since the four instruction word registers 16-1 to 16-4 are prepared, if four dedicated registers cannot be allocated, the instructions cannot be simultaneously stored into the reservation station processing unit 24. At a point when all of the dedicated registers have been allocated, the instructions have to be stalled in the decoding cycle. The register update buffer 46 is prepared as a dedicated register which is allocated every instruction. In the embodiment, for example, 64 entries are held in the register update buffer 46.

As a method whereby the dedicated register is allocated every instruction and contents of the registers are updated and referred to in program order, register renaming has been known. The register renaming will be specifically explained hereinbelow. It is now assumed that there are instructions 1, 2, and 3.

$R1+R2=R3$          Instruction 1

$R3+R4=R3$          Instruction 2

$R3+R8=R9$          Instruction 3

Among the three instructions 1 to 3, there is a dependent relation between a destination register R3 of the instruction 1 and a first operand register R3 of the instruction 2. There is also a dependent relation between a destination register R3 of the instruction 2 and a first operand register R3 of the instruction 3. In such a case, according to the register renaming, the destination register R3 of the instruction 1 and the first operand register R3 of the instruction 2 are set to, for example, a renaming register R3$a$ and the dedicated register is allocated. A renaming register R3$b$ is allocated to the destination register R3 of the instruction 2 and the first operand register R3 of the instruction 3. Use of the renaming register R3$a$ allocated when the instruction is decoded is assured until the instruction 1 is committed. Use of the renaming register R3$b$ is assured until the instruction 2 is committed.

Figure 3:
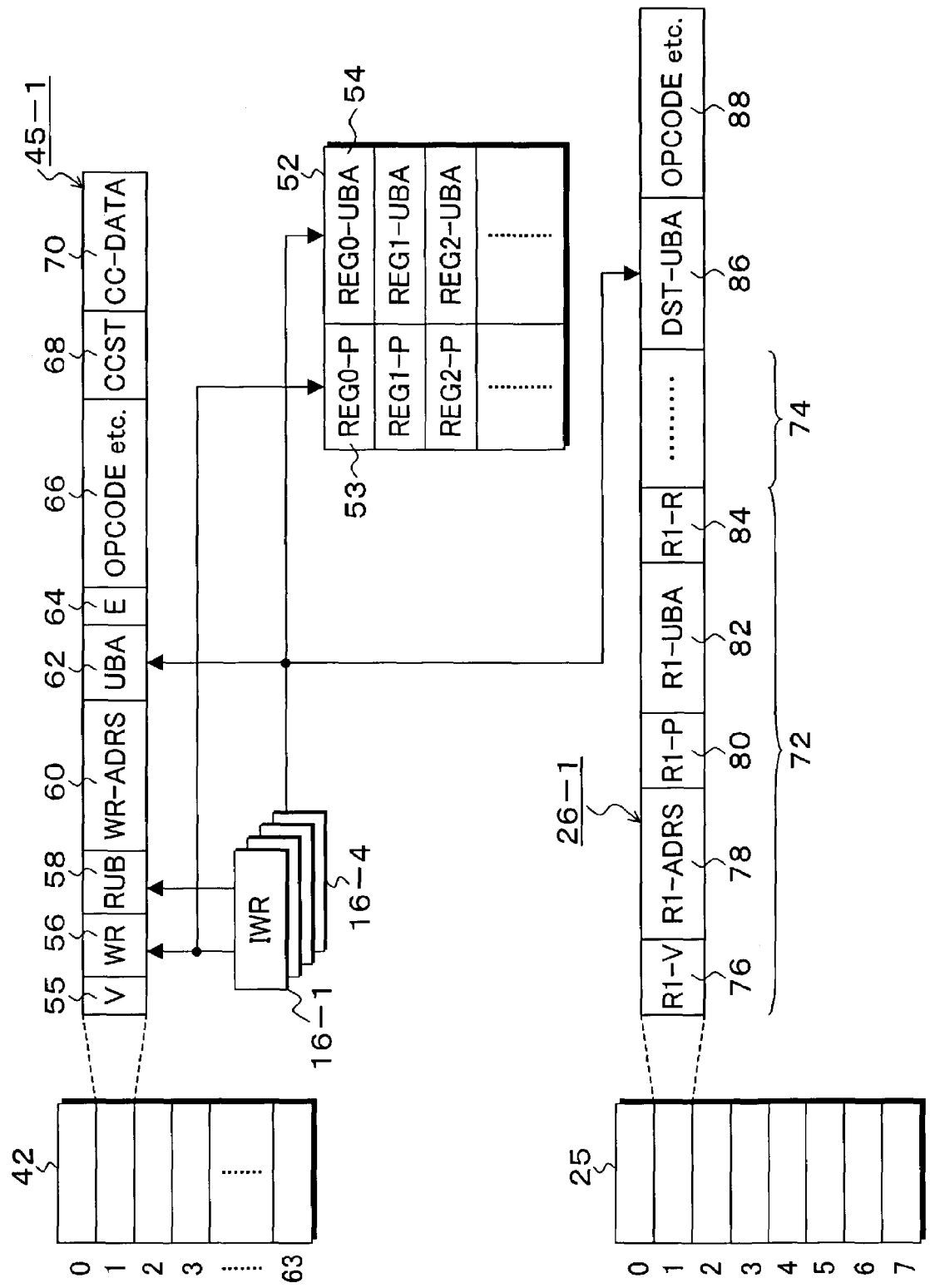
FIG. 3 is an explanatory diagram of an ordinary renaming map updating process.

FIG. 3 is an explanatory diagram of a renaming map updating process in the case where the register has been allocated onto the register update buffer 46 in the decoding cycle of the instruction in the invention. In the decoding cycle of an arithmetic operating instruction for updating the register and a fetching instruction, a dedicated register for holding register update data until an execution result of the instruction is committed is allocated onto the register update buffer 46. That is, with respect to the four instructions of the four instruction word registers 16-1 to 16-4, four buffers are allocated onto the register update buffer 46 in FIG. 2, and information regarding the allocated buffers is held in a renaming map 52. The renaming map 52 has a pending bit 53 and an allocation address 54. The pending bit 53 is set every allocation register allocated in correspondence to the four instructions. A relation between a general register REG and an allocation address UBA in the update buffer has been registered as an allocation address 54. Simultaneously with the decoding of the four instructions in the four instruction word registers 16-1 to 16-4, for example, as shown with respect to the instruction word register 16-1, an allocation entry 26-1 corresponding to the instruction is held in a reservation station 25 and an allocation entry 45-1 corresponding to the instruction is also held in the commit stack entry 42. The allocation entry 45-1 of the commit stack entry 42 comprises fields of: a valid bit 55; a write register allocation bit 56; a register update buffer allocation bit 58; a write register address 60; an update buffer allocation address 62; an arithmetic operation completion wait bit 64; an instruction operation 66 such as an OP code or the like; a condition code register write bit 68; and condition code data 70. Simultaneously with the allocation corresponding to the instruction of the allocation entry 45-1, the bit setting of the write register allocation bit 56, the bit setting of the register update buffer allocation bit 58, and the writing of the allocation address to the update buffer allocation address 62 are executed in the decoding cycle of the instruction. With respect to the allocation entry 26-1 corresponding to the instruction held in the reservation station 25, subsequent to a first source register area 72 and a second source register area 74, a destination update buffer allocation address 86 and an instruction operation 88 such as an OP code or the like have been stored. A first source register valid bit 76, a first source register address 78, a first source register pending bit 80, a first source register update buffer allocation address 82, and a first source register bypass ready bit (forward ready bit) 84 are provided in the first source register area 72. Although fields similar to those in the first source register area 72 are also provided in the second source register area 74, they are not shown. In the following explanation, the first source register is abbreviated to R1 and the second source register is abbreviated to R2.

Figure 4:
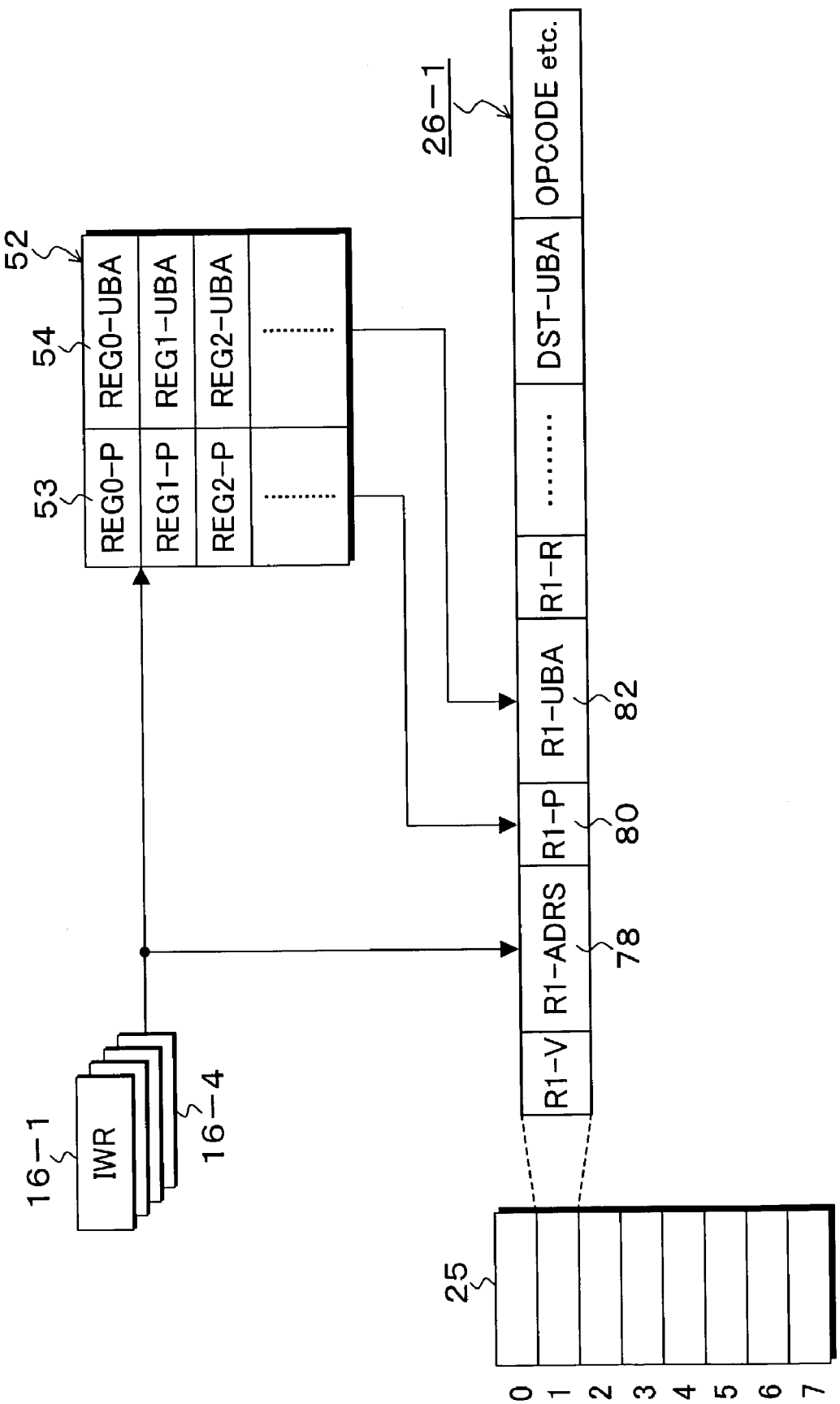
FIG. 4 is an explanatory diagram of a referring process to the renaming map updated in FIG. 3.

FIG. 4 is an explanatory diagram in the case where the following instruction refers to the renaming map 52 updated in FIG. 3. For example, FIG. 3 shows the foregoing instruction 1 and it is referred to upon execution of the next instruction 2. When the instruction of the instruction word register 16-1 is assumed to be the following instruction, the following instruction refers to the renaming map 52 by an address of the register serving as a reading source, for example, by an address "REG0" and refers to the R1 pending bit 80 and the first source register update buffer allocation address 82 in the allocation entry 26-1 in the reservation station 25 by the pending bit 53 and allocation address 54. By referring to the execution result of the previous instruction, the forward control to a following instruction as shown in FIG. 5 can be executed.

Figure 5:
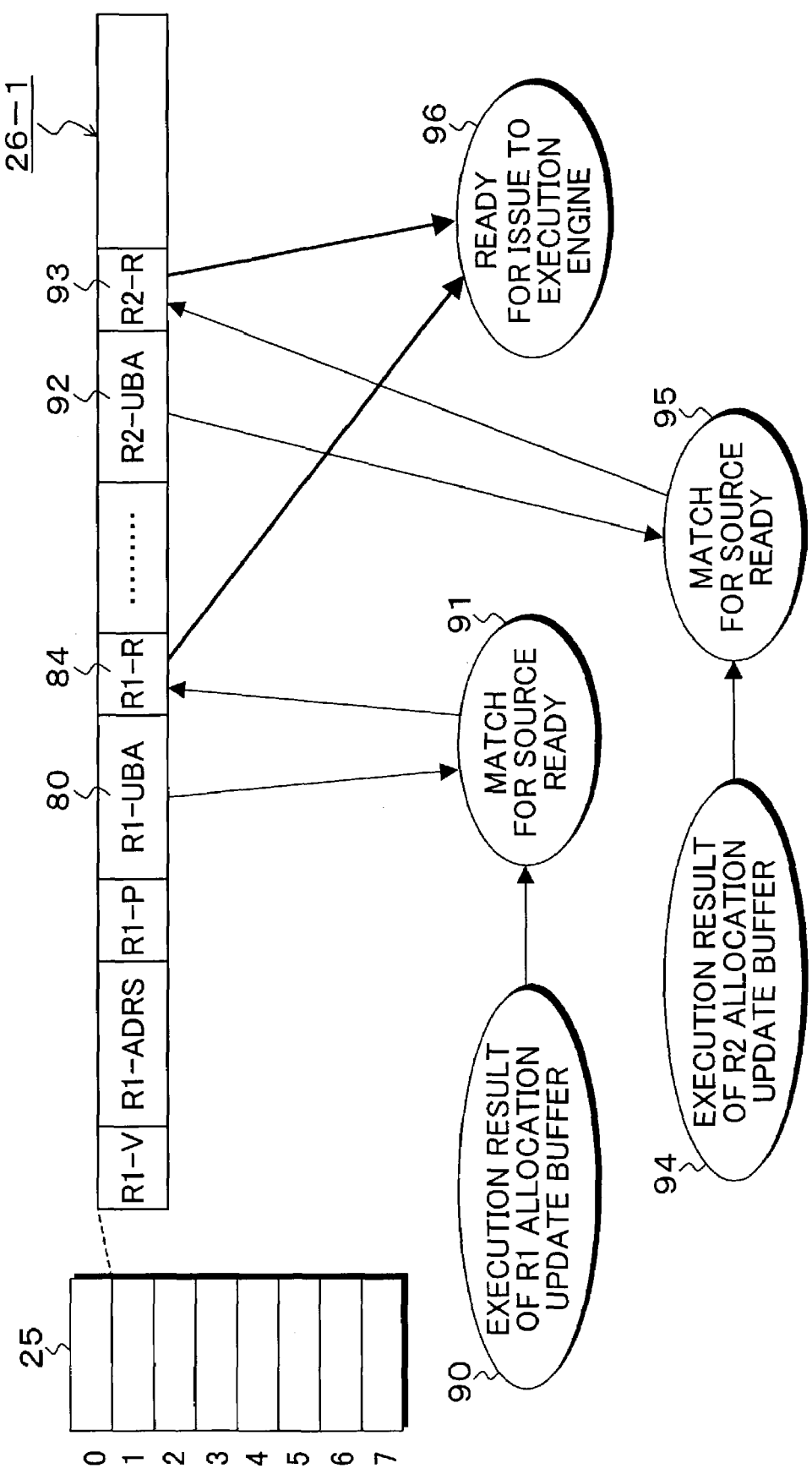
FIG. 5 is an explanatory diagram of forward control for executing following instruction at the time when a previous instruction is committed.

In the forward control of the following instruction in FIG. 5, an R1 register update buffer execution result 90 in the previous instruction and the R1 update buffer allocation address 82 in the allocation entry 26-1 obtained by the reference to the renaming map 52 in FIG. 4 are compared by a process 91. If they coincide, the R1 bypass ready bit 84 of the allocation entry 26-1 is set. If an R2 update buffer execution result 94 is also obtained with respect to the previous instruction, the R2 update buffer execution result 94 and an R2 update buffer allocation address 92 obtained by the reference via the renaming map 52 are likewise compared by a process 95. If they coincide, an R2 bypass ready bit 93 is set. If the bypass ready to the following instruction, that is, the forward ready is determined from the execution result of the previous instruction as mentioned above, like a process 96, on the basis of the bypass ready bits 84 and 93, the instruction executing unit 28 in FIG. 2 is notified of the fact that the executing conditions are satisfied, and the following instruction in which the execution result of the previous instruction has been forwarded is executed.

Figure 6:
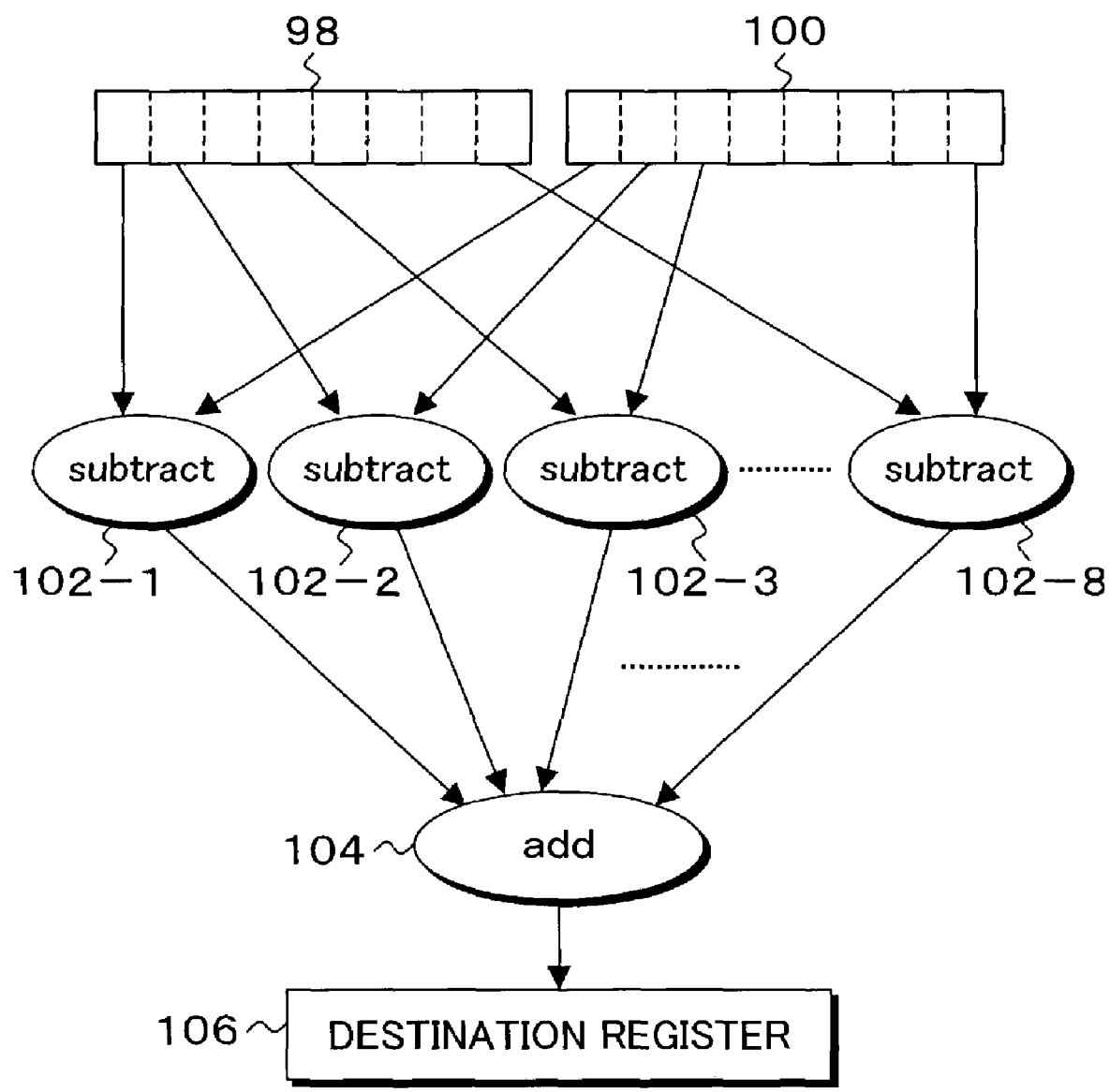
FIG. 6 is an explanatory diagram of the instruction operation of a pixel distance instruction in the case where a multiflow is not formed.

FIG. 6 is an explanatory diagram of the ordinary instruction operation of a pixel distance instruction which is issued by the SPARC instruction architecture serving as a control target of the invention. In the pixel distance instruction, pixel data of 64 bits has been stored in each of a first source register 98 and a second source register 100, and the instruction operation is executed in a manner such that the pixel data of 64 bits is divided on an 8-bit unit basis, each of subtractions 102-1 to 102-8 is executed every corresponding 8 bits, eight subtraction results are added by an addition 104, and an addition result is stored into a destination register 106. With respect to such a pixel distance instruction, the processor of the invention executes a multiflow development such that it is internally developed into a plurality of instruction flows comprising a previous flow and a following flow and the instruction operation is executed in order.

Figure 7:
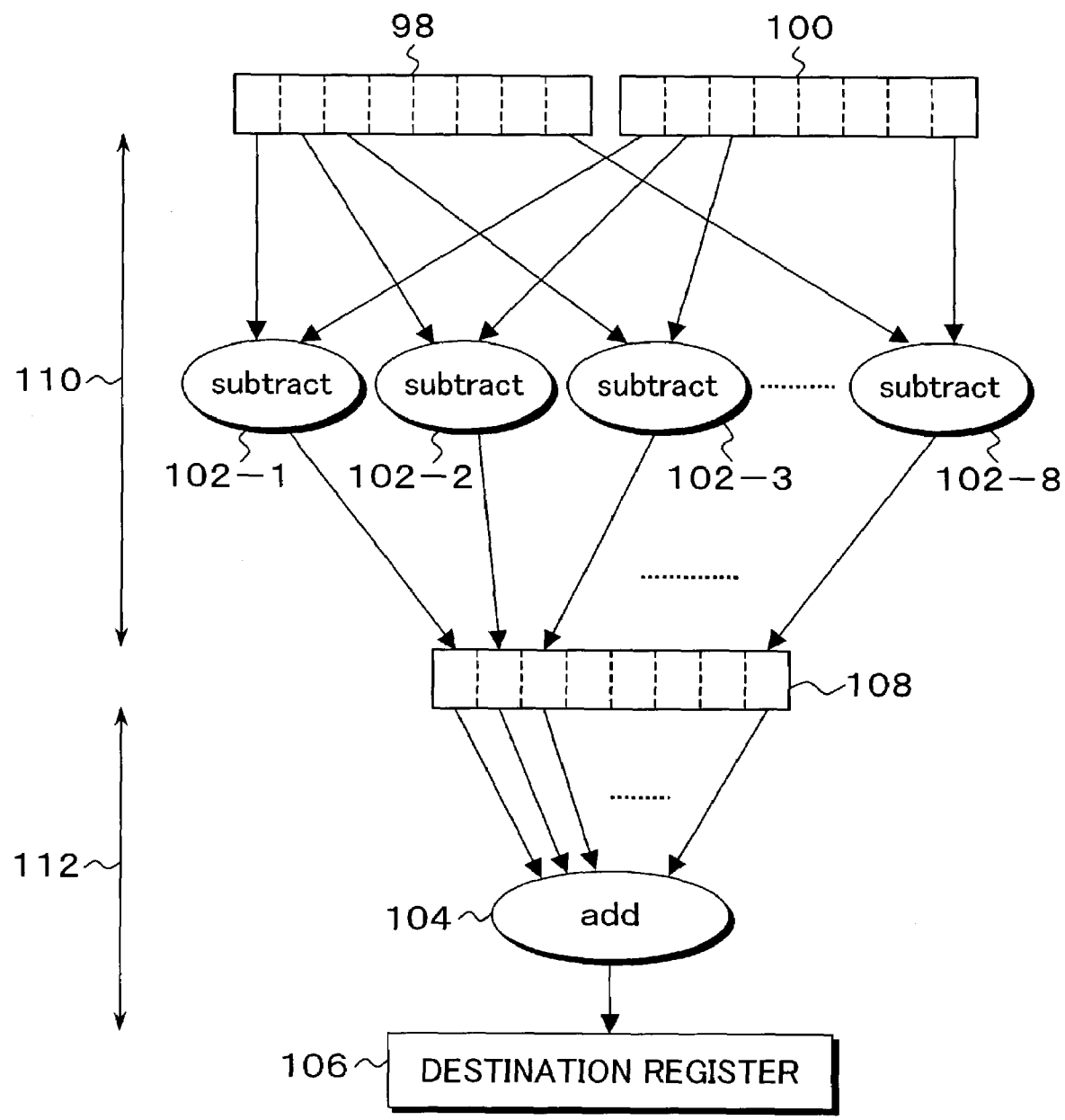
FIG. 7 is an explanatory diagram of the instruction operation of a pixel distance instruction in the case where a multiflow is formed.

FIG. 7 is an explanatory diagram of the instruction operation in the case where the pixel distance instruction in FIG. 6 is developed into the multiflow. The pixel distance instruction developed into the multiflow executes the instruction operation such that in a previous flow 110, the pixel data of 64 bits of each of the first source register 98 and the second source register 100 is divided on an 8-bit unit basis and each of the subtractions 102-1 to 102-8 is executed every corresponding 8 bits. An execution result of the previous flow 110 is stored into a dedicated register 108 allocated in the decoding cycle of the previous flow 110. In a following flow 112, eight subtraction results stored in the dedicated register 108, that is, the execution results of the previous flow 110 are taken out and added by the addition 104, and an addition result is stored into the destination register 106. With respect to the instruction to be developed into the multiflow as mentioned above, hitherto, a dedicated hardware register has been prepared as a dedicated register 108 for storing the execution results of the previous flow 110. However, in the invention, the register on the register update buffer 46 in FIG. 2 used for the register renaming is allocated in order to reduce the hardware resources.

Figure 8:
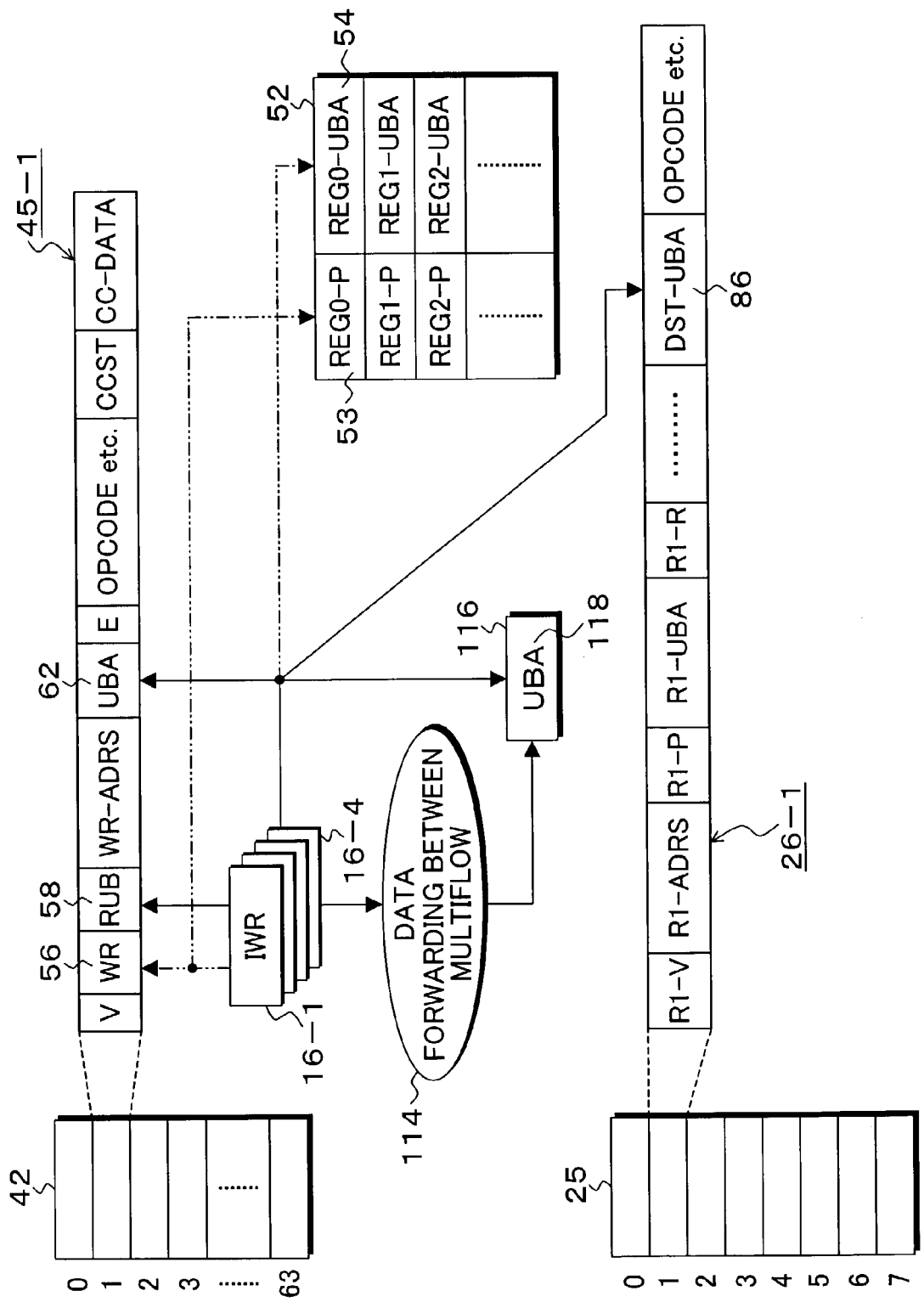
FIG. 8 is an explanatory diagram of a renaming map updating process of the invention in the multiflow of FIG. 7.

FIG. 8 is an explanatory diagram of an updating process of the renaming map in association with the register allocation of the update buffer in the decoding cycle of the previous flow 110 in FIG. 7. Assuming that, for example, the pixel distance instruction was decoded by the instruction word register 16-1, even in the first flow in which an execution result of the decoding is not written into the register, a buffer which is used for forward-controlling the data to the following instruction is allocated onto the register update buffer 46. Since the data of the allocation buffer for forward-controlling the data to the following instruction is not written into the general register, it is not registered into the renaming map 52. An imaginary line to the renaming map 52 indicates registration in the ordinary instruction in FIG. 3. A latch 116 is prepared as dedicated means for storing an update buffer allocation address 118 of the allocation register for storing the data for the forward control of the following instruction. The update buffer allocation address 118 on the register update buffer 46 is stored as, for example, "UBA" into the latch 116 by a first flow decoding cycle 114. In the first flow decoding cycle 114, the previous flow allocation entry 45-1 is held in the commit stack entry 42. The register update buffer allocation bit 58 and the update buffer allocation address 62 are stored into the previous flow allocation entry 45-1 in the decoding cycle of the previous flow. At the same time, the previous flow allocation entry 26-1 is held in the reservation station 25 in the decoding cycle of the previous flow. The destination update buffer allocation address 86 is stored in the instruction decoding cycle.

Figure 9:
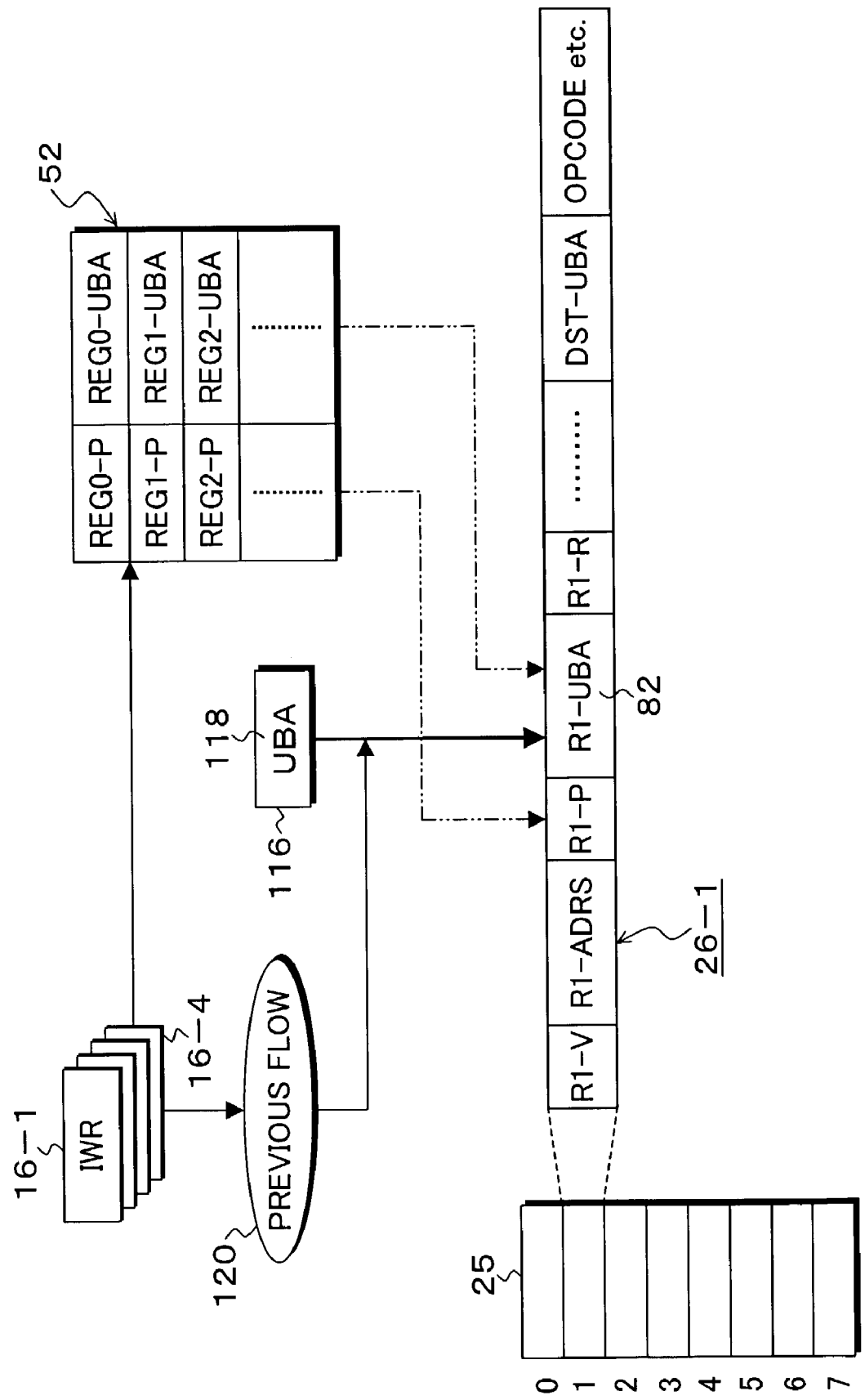
FIG. 9 is an explanatory diagram of a referring process to the renaming map updated in FIG. 8.

FIG. 9 is an explanatory diagram of a process for allowing the renaming map 52 updated in the decoding cycle of the previous flow in FIG. 8 to be referred to in the decoding cycle of the following flow. When a previous flow decoding cycle 120 is executed in the instruction word register 16-1, nothing is obtained even if the renaming map 52 is referred to by the register address. In this case, the update buffer allocation address 118 on the register update buffer 24 in which the execution result of the previous flow has been stored is obtained with reference to the latch 116. The R1 update buffer allocation address 82 in the previous flow allocation entry 26-1 in the reservation station 25 is referred to. The execution result of the first flow can be forward-controlled to the following flow.

Figure 10:
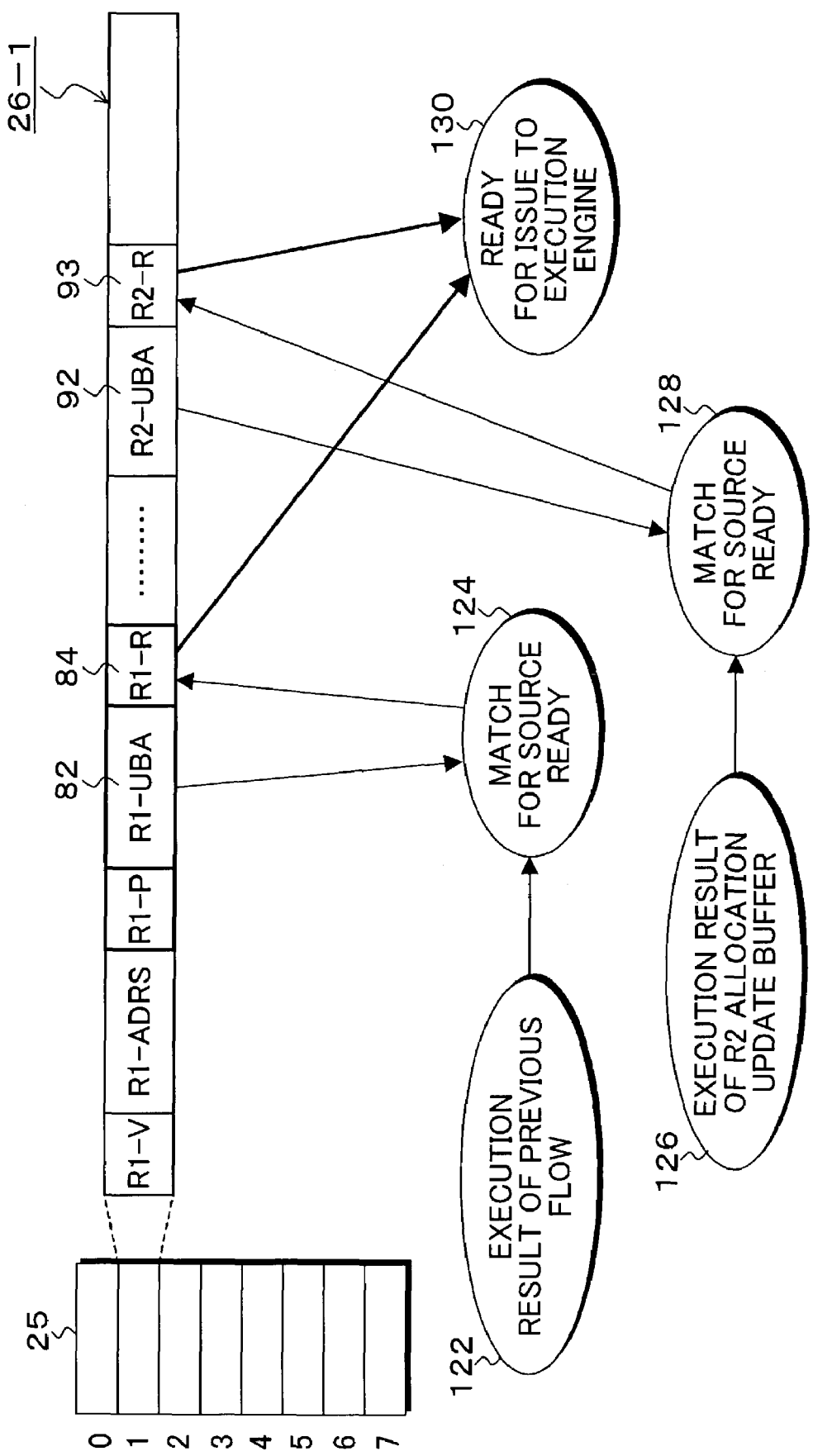
FIG. 10 is an explanatory diagram of forward control to a following flow which is discriminated when an execution result of a previous flow is committed.

FIG. 10 is an explanatory diagram of forward control to the following flow based on the renaming map referring process in FIG. 9. When the previous flow is committed, a previous flow execution result 122 and the R1 bypass ready bit 84 in the previous flow allocation entry 26-1 in the reservation station 25 obtained by the renaming map referring process in FIG. 9 are set. In the forward control of the multiflow, since an R2 update buffer execution result 126 does not exist, the setting of the bypass ready bit 93 by a process 128 is not executed. Therefore, when the R1 bypass ready bit 84 is set by a process 130, the execution result of the first flow is forward-controlled and a ready signal for executing the instruction operation is issued to the instruction executing unit 28 in FIG. 2, thereby allowing the instruction operation to be executed.

As mentioned above, in the case where the pixel distance instruction in FIG. 7 is developed into the multiflow and the execution result of the previous flow is forward-controlled to the following flow, according to the invention, the register on the register update buffer 46 is allocated as a dedicated register for holding the execution result of the previous flow 110. There is, consequently, a problem such that the data in the allocation register in which the execution result of the first flow has been stored cannot be guaranteed until the execution result of the following flow is committed. That is, the allocation register on the register update buffer 46 allocated in the decoding cycle of the previous flow is released by the commitment of the execution result of the first flow. Therefore, if there is a time-dependent blank between the previous flow and the following flow, the allocation register in which the execution result of the previous flow has been stored is used by another instruction executed during such a blank period of time and there is a fear such that the execution result of the previous flow is broken. To prevent such a problem, according to the invention, the multiflow guarantee processing unit 20 provided in FIGS. 1A and 1B guarantees that the execution result of the previous flow can be held on the allocation register until the execution result of the following flow is committed.

Figure 11:
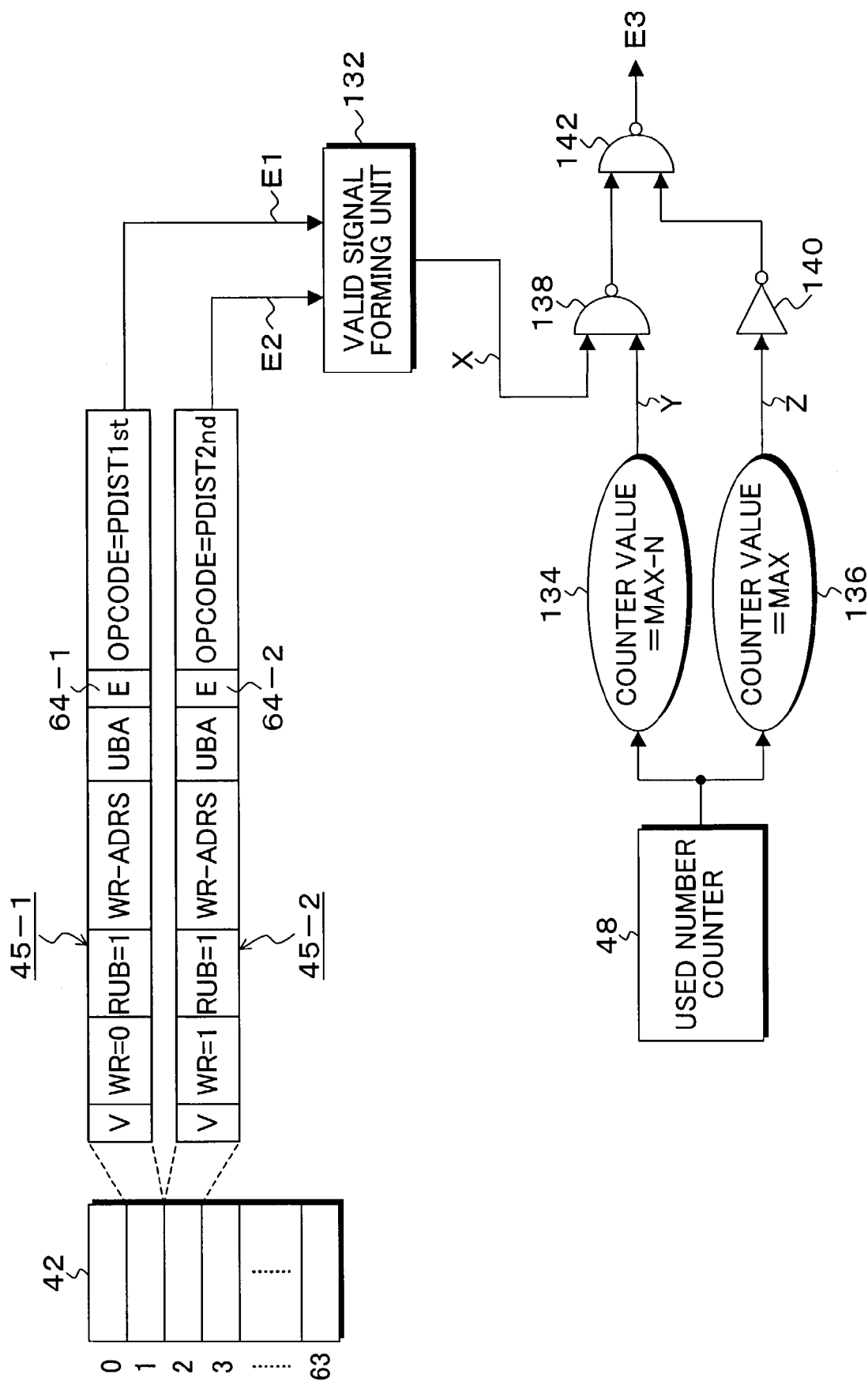
FIG. 11 is an explanatory diagram of an embodiment of a multiflow guarantee processing unit in FIGS. 1A and 1B for guaranteeing the execution result of the previous flow until a commitment of the following flow.

FIG. 11 is an explanatory diagram showing an embodiment of the multiflow guarantee processing unit 20 in FIGS. 1A and 1B. The previous flow allocation entry 45-1 is held in the commit stack entry 42 and a following flow allocation entry 45-2 which is executed after an interval corresponding to the number of flows N=1 is also held. With respect to the previous flow allocation entry 45-1 in the commit stack entry 42 as mentioned above, when the execution result of the previous flow is committed, specifically speaking, when an arithmetic operation completion wait bit 64-1 is set to "0" indicative of a committable state from "1" indicative of a completion waiting state, a set signal E1 is outputted to a valid signal forming unit 132, and a valid signal (X) which is outputted is set to an ON state. When the execution result of the following flow is committed, a change from bit "1" to bit "0" of an arithmetic operation completion wait bit 64-2 in the following flow allocation entry 45-2 is likewise detected, a reset signal E2 is outputted to the valid signal forming unit 132, and the valid signal (X) in the ON state is set to an OFF state. A counter value of a used number counter 48 provided for the resource monitor 50 in FIG. 2 is monitored by a counter value discriminating unit 134 and a buffer-full detecting unit 136. The used number counter 48 counts using states of 64 entries in the register update buffer 46 in FIG. 2. That is, the used number counter 48 is counted up each time the register is allocated onto the register update buffer 46 via the decoding cycle of the instruction. Each time the allocation register is released by the commitment of the execution result of the instruction, the used number counter 48 is counted down. Thus, the counter value of the used number counter 48 changes in a range of 0 to 63 in association with the allocation and release of the register. When the count value of the used number counter 48 reaches a value (MAX−N) obtained by subtracting the number (N) of flows between the first and second flows from the maximum number (MAX) of entries of the register update buffer, the counter value discriminating unit 134 sets a counter value discrimination signal (Y) to "1". When the count value of the used number counter 48 reaches the maximum number MAX, the buffer-full detecting unit 136 sets a buffer-full signal (Z) to "0". The valid signal (X), counter value discrimination signal (Y), and buffer-full signal (Z) obtained as mentioned above are discriminated by a logic circuit unit comprising NAND gates 138 and 142 and an inverter 140, and a decode stage stall signal E3 is outputted. A logic condition by the logic circuit unit in which the decode stage stall signal E3 is set to "1" is as follows.

{(valid signal X and counter value discrimination signal Y) or buffer-full signal Z}

That is, when the used number counter 48 reaches the maximum number and the buffer-full signal (Z) is equal to "1", the decode stage stall signal E3 is set to "1", thereby stalling the decode stage. Even if the buffer-full signal (Z) is not equal to "1", when the valid signal (X) is equal to "1", the count value is equal to (MAX−N), and the counter value discrimination signal (Y) is equal to "1", the decode stage stall signal E3 is set to "1", thereby allowing the instruction in which the registers on the register update buffer 46 are set to the allocation addresses to be newly stalled in the decoding cycle.

Figure 12:
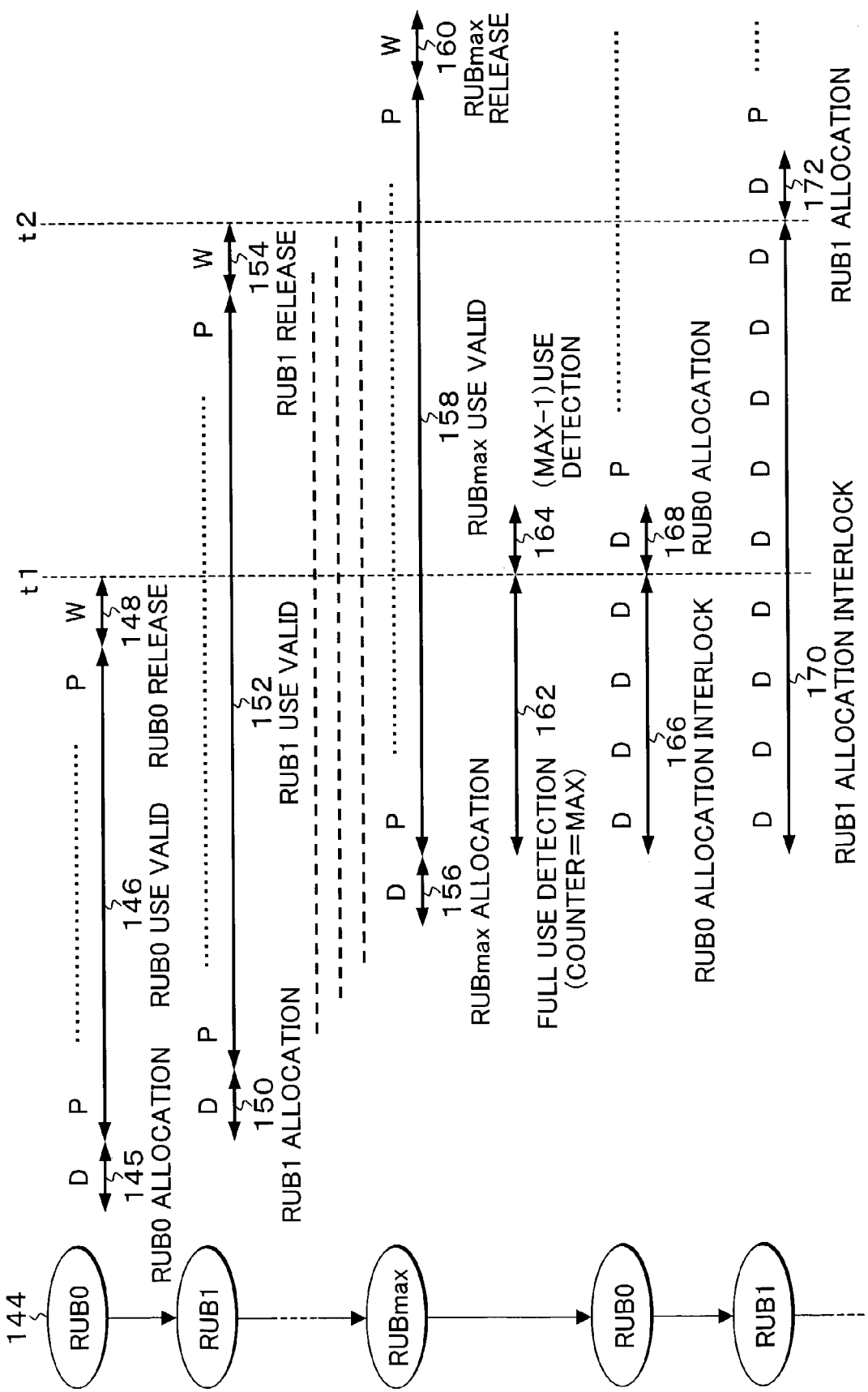
FIG. 12 is a time chart for allocation of a register update buffer in the ordinary instruction execution and a forming state of a signal in each section in FIG. 11.

FIG. 12 is a time chart for a signal in each section in allocation of the register update buffer in the ordinary instruction execution by the multiflow guarantee processing unit in FIG. 11. Allocation registers in the register update buffer 46 are shown by RUB0, RUB1, . . . , RUBmax, RUB0, and RUB1 on the left side of the diagram. In a decoding cycle D of the first instruction, the register RUB0 is allocated like a process 145 and the value of the used number counter 48 is equal to "0". Subsequently, the instruction is sent to a reservation station by a priority cycle P. While the apparatus waits for execution of the instruction, use of the register RUB0 is validated like a process 146. If the first instruction is assumed to be, for example, a storing instruction, the instruction is committed at time t1 by a process 148 in a writing cycle W and the register RUB0 is released. With respect to the next instruction, the register RUB1 is allocated by the decoding cycle D of a process 150. Use of the register RUB1 is validated for a period of time of a priority cycle of a process 152. The register RUB1 is released by a process 154 of the writing cycle W. In a manner similar to the above, the similar instruction operation is repeated until the value of the used number counter 48 is set to "MAX". In a process 158 of the priority cycle P subsequent to a process 156 of the decoding cycle D in which the value of the used number counter 48 is set to "MAX", the buffer-full signal (Z) from the buffer-full detecting unit 136 in FIG. 11 is set to "1" until time t1 when the first allocated register RUB0 is released by the process 148. Therefore, the decode stage stall signal E3 from the NAND gate 142 is set to "1" irrespective of the states of the valid signal (X) and the counter value discrimination signal (Y). Until the instruction which allocated the register RUB0 is committed at time t1, an RUB0 allocation interlock of a process 166 is executed in order to stall the decoding cycle D of the next instruction. When the instruction is committed at time t1 and the register RUB0 is released, the used number counter 48 is counted up and the counter value is equal to (MAX −1). The decode stage stall signal E3 is set to "0" and the interlock is released. The register RUB0 is allocated to a new instruction by a process 168 of the decoding cycle subsequent to time t1. At this time, assuming that another instruction scheduled to allocate the register RUB1 to be released next has simultaneously been decoded, the buffer-full signal (Z) is set to "1" by the allocation of the register RUB0. Therefore, the decode stage stall signal E3 is set to "1". Until the instruction which allocated the register RUB0 is committed at time t2, an RUB1 allocation interlock of a process 172 is executed in order to stall the decoding cycle D of the next instruction.

FIG. 13 is a time chart for allocation of the register update buffer in the instruction execution of the multiflow according to the invention and the signal in each section in FIG. 11. Allocation registers in the register update buffer in the decoding cycle of the instruction are shown by RUB0, RUB1, . . . , RUBmax, RUB0, and RUB1 on the left side of the diagram. First, when the register RUB0 is allocated in the decoding cycle D of the previous flow like a process 175, use of the register RUB0 is validated like a process 176 in the next priority cycle P. If the instruction operation of the first flow is finished in the writing cycle W, the register RUB0 is released by receiving a commitment of the instruction in a process 178. By the commitment of the previous flow at time t1, the valid signal forming unit 132 in FIG. 11 receives the set signal E1 from a previous flow allocation 145-1 and is set. The valid signal (X) is formed like a process 180. Subsequently, when the operating cycle enters the decoding cycle D of the following flow after the number of flows N=1, the register RUB1 is allocated to the following flow like a process 182. Use of the register RUB1 is validated during a process 184 of the priority cycle P. Subsequently, the following flow is subjected to the forward control of the execution result of the previous flow at time t12, executes an executing operation EX, stores it into the register in an updating cycle U, and further, stores a result of the arithmetic operation into the register in the writing cycle W. In a process 186 of the writing cycle W, the instruction of the second flow is committed and the register RUB1 is released at time t2. Subsequent to such an instruction operation of the multiflow comprising the previous flow and the following flow, the following instructions are sequentially processed. When the register RUBmax is allocated in the decoding cycle D of the instruction by a process 188, the value of the used number counter 48 is set to the maximum value "MAX". Until the first register RUB0 is released at time t1, the full use is detected like a process 192. Therefore, two following instructions to which the registers RUB0 and RUB1 will be allocated next are subjected to the allocation interlock of the register RUB0 and the allocation interlock of the register RUB1 by processes 196 and 200 and stalled in each decoding cycle D. In this state, even if the register RUB0 allocated to the previous flow at time t1 is released by the commitment of the previous flow like a process 178, the valid signal (X) is formed and is set to "1" like a process 180. At the same time, it is discriminated by the counter value discriminating unit 134 in FIG. 11 that the counter value is equal to "MAX−N=MAX−1" and the counter value discrimination signal (Y) is set to "1". The number of used registers "MAX−1" of the counter value is detected like a process 194. Therefore, since both of the valid signal (X) and the counter value discrimination signal (Y) are set to "1" by the processes 180 and 194, irrespective of the release of the buffer-full detection at time t1, the instructions to which the registers RUB0 and RUB1 will be allocated next like processes 196 and 200 are interlocked in the decoding cycles and stalled. When the register RUB1 allocated to the following flow is released at time t2 like a process 186 by the commitment of the following flow, the reset signal E2 is outputted to the valid signal forming unit 132 in FIG. 11 and the valid signal (X) is set to "0" at this time. Thus, the decode stage stall signal E3 from the NAND gate 142 is set to "0" and the interlock is cancelled. Therefore, the register RUB0 of the previous flow which was released in the decoding cycle D of processes 198 and 202 subsequent to time t2 is allocated as a register to a new instruction. Also with respect to the released register RUB1 of the following flow, it is allocated as a register to the next new instruction. Owing to the processes by the multiflow guarantee processing unit in FIG. 11 as mentioned above, even if the allocation register RUB0 of the previous flow is released by the commitment at time t1, with respect to the next new instruction which intends to allocate the released register RUB0, the decoding cycle is stalled until the following flow is committed at time t2 by the output of the decode stage stall signal E3. Thus, the data storage in the allocation register RUB0 in which the execution result of the previous flow has been stored is guaranteed until the following flow is committed, and the instruction operation of the following flow can be certainly executed by the forward control of the execution result of the previous flow. A performance penalty 201 occurring because a guarantee cycle of the register is extended from time t12 to commit time t2 during the execution of the following flow is caused only when the commitment of the previous flow and that of the following flow are away from each other and the number of used registers at that time is equal to "the maximum number−N". However, the performance penalty 201 is caused only in a few cycles. As such instruction control of the multiflow, according to the invention, by using the register, in common, on the register update buffer which is used for the register renaming without preparing a plurality of dedicated registers for forward controlling the execution result of the previous instruction to the following instruction, the processor resources can be saved and a plurality of instruction operations serving as a multiflow can be certainly executed.

Figure 14B:
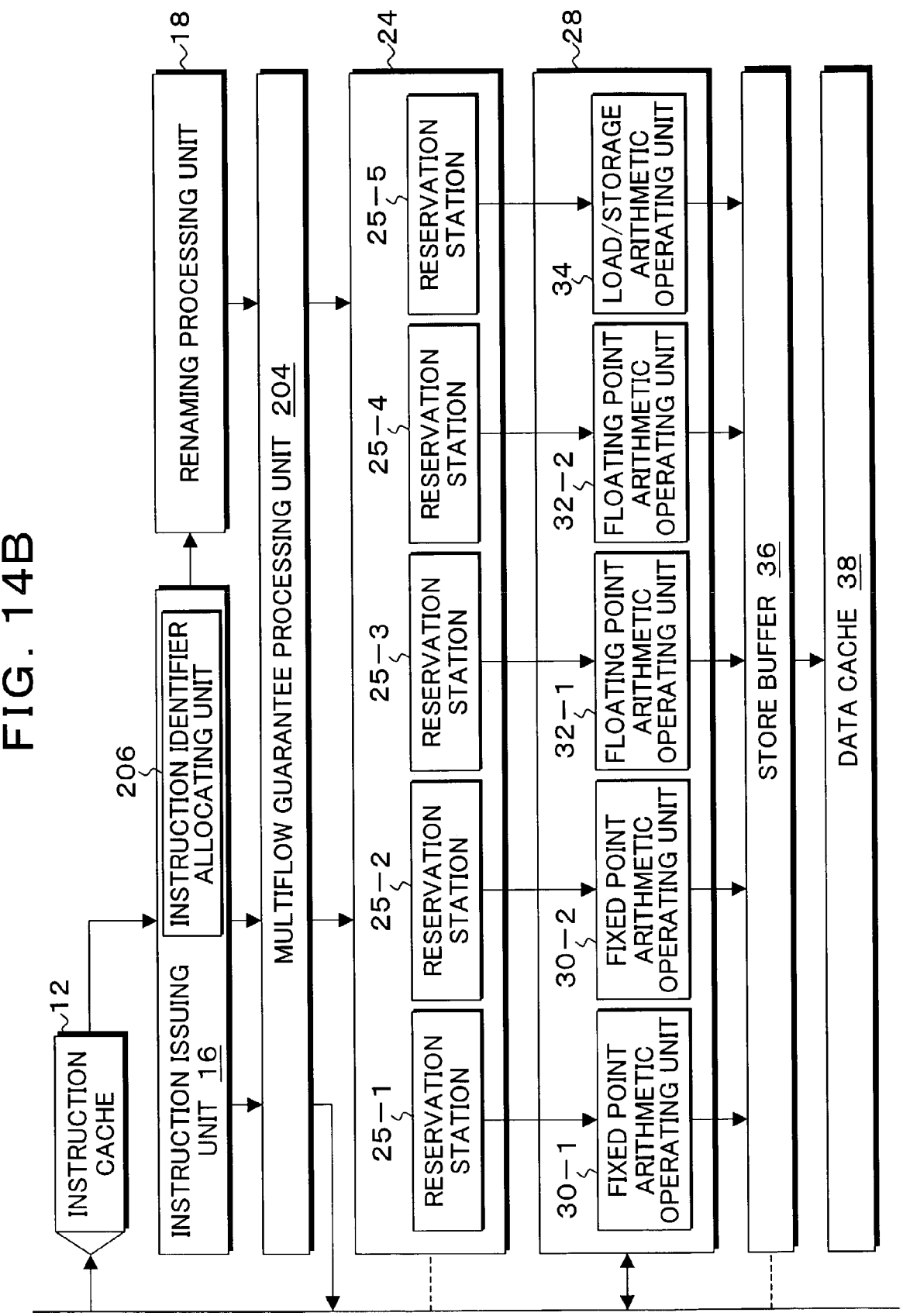

FIGS. 14A and 14B show another embodiment of instruction control in the processor according to the invention. The embodiment is characterized in that with respect to an instruction identifier (IID) which is allocated when instruction operations of a multiflow are executed, the instruction ID allocated to the previous flow is guaranteed until the following flow is committed. In the processor for guaranteeing the instruction ID as mentioned above, a multiflow guarantee processing unit 204 executes a process for guaranteeing the instruction ID allocated to the previous flow until the commitment of the following flow although it is fundamentally the same as the embodiment of FIGS. 1A and 1B. In correspondence to the guaranteeing process of the instruction ID, an instruction identifier allocating unit 206 for allocating the instruction ID with respect to each of the previous flow and the following flow in the decoding cycle is provided for the instruction issuing unit 16. An IID used number counter 208 for counting the number of using times of the instruction ID which is allocated by the instruction identifier allocating unit 206 is provided for the resource monitor 50.

FIG. 16 is an explanatory diagram of an instruction operation of the compare and swap instruction which is used in the SPARC instruction architecture which needs to guarantee the instruction ID of the previous flow serving as a target in the instruction control of the processor in FIG. 15 until the commitment of the following flow.

The compare and swap instruction is described as cas [rs1], rs2, rd

That is, in a previous flow 210 in which IID=x in FIG. 15, memory fetch data is obtained by referring to the memory by setting the register rs1 to an address in step S1. It is compared with the value of the register rs2 in step S2. A comparison result is stored as an internal condition code CC into condition code data CC-DATA of a commit stack entry corresponding to IID=x. As an internal condition code CC, a value "CC=1" is stored when the comparison result in step S2 indicates that they coincide, and a value "CC=0" is stored when they do not coincide. To replace (swap) the memory fetch data into the register rd, the memory fetch data is stored into the renaming register in step S4. In a following flow 212 in which IID=x+1, whether the data in the register rd is stored into a memory address according to the register rs1 or not is discriminated by the internal condition code CC. That is, in the case of CC=1 where the comparison result indicates the coincidence, in step S5, the data in the register rd is written into the memory address according to the register rs1 sent by IID=x of the previous flow 210. In the case of CC=0 where the comparison result indicates the dissidence, in step S6, the data writing into the memory address according to the register rs1 is not performed. Further, in parallel with step S5 or S6, the memory fetch data held in the renaming register in step S5 is written into the register rd in step S7. As mentioned above, in the decoding cycle in the previous flow 210, for example, IID=x is allocated as an instruction identifier. Subsequently, the instruction operation of the following flow 212 is executed and IID=x+1 is allocated in the decoding cycle of the following flow 212. However, in the allocating process of the IID of the following flow 212, an emulation for changing the allocated IID=x+1 to the same IID=x as that of the previous flow 210 is executed in step S5. In the decoding cycle of the following flow 212, a following flow allocation entry is allocated into the commit stack entry. Subsequently, when the following flow 212 enters the priority cycle from the decoding cycle and the instruction executing operation is further executed, the commit stack entry is referred to by IID=x emulated as an IID. Although the previous flow allocation entry and the following flow allocation entry have been allocated to the commit stack entry, since the same instruction ID=x is executed with respect to both entries, the previous flow allocation entry and the following flow allocation entry are handled as the same entry. Therefore, at the start of the execution of the following flow 212, the condition code data CC-DATA of the previous flow allocation entry can be referred to by IID=x. A process of the following flow 212 to the condition code data CC-DATA has been predetermined at that time as follows.

(1) When the comparison result indicates the coincidence and the condition code data is equal to "CC=1", the data in the register rd is executed as storage data (S6).
(2) When the comparison result indicates the dissidence and the condition code data is equal to "CC=0", the data in the register rd is abandoned as storage data (S7).

In such instruction control of the multiflow in which the instruction identifier IID has been allocated, IID=x allocated to the previous flow has to be guaranteed until the following flow is committed. The instruction identifier IID is allocated in the decoding cycle of the instruction and the register is released by the commitment of the instruction. Therefore, when there is an interval between the previous flow 210 and the following flow 212, there is a case where IID=x of the previous flow is allocated by another instruction and is not guaranteed until the following instruction is committed. Therefore, in the invention, the multiflow guarantee processing unit 204 shown in the embodiment of FIG. 16 enables the instruction identifier allocated to the previous flow to be guaranteed until the commitment of the following flow.

In FIG. 16, a previous flow allocation entry 245-1 and a following flow allocation entry 245-2 are allocated to the commit stack entry 42 in correspondence to the decoding cycle in association with the development of the compare and swap instruction into the multiflow. A set signal E10 is outputted from an OP code of an instruction operation 66-1 of the previous flow allocation entry 245-1 by the commitment of a previous flow (CAS1st) of the compare and swap instruction. A reset signal E20 is outputted from an OP code of an instruction operation 66-2 of the following flow allocation entry 245-2 by the commitment of a following flow (CAS2nd) of the compare and swap instruction. A valid signal forming unit 234 sets the valid signal (X) which is outputted by the set signal E10 to "1" and sets the valid signal (X) to "0" by the reset signal E20. The IID used number counter 208 counts the number of using times of the instruction ID (IID) which is allocated in the instruction decoding cycle. This count value is sent to a counter value discriminating unit 236 and a full use detecting unit 238. When the counter value is equal to a value (MAX−N) obtained by subtracting the number of flows (N) serving as a difference between the previous flow and the following flow from the maximum number of use "MAX", the counter value discriminating unit 236 sets the counter value discrimination signal (Y) to "1". When the counter value of the counter 208 which is used in the IID is equal to the maximum value MAX, the full use detecting unit 238 sets a full use detection signal (Z) as an output signal to "1". The valid signal (X), counter value discrimination signal (Y), and full use detection signal (Z) are discriminated by a logic circuit unit comprising NAND gates 240 and 244 and an inverter 242, and a decode stage stall signal E30 is outputted. A condition in which the decode stage stall signal E30 is set to "1" by the logic circuit unit is as follows.

{(valid signal X and counter value discrimination signal Y) or full use detection signal Z}

That is, in the IID used number counter 208, if the number of using times of the IID reaches the maximum value MAX, the decode stage stall signal E30 is set to "1", thereby stalling the decoding cycle of the instruction to which the IID will be allocated next. In a state where the valid signal (X) is equal to "1", when the value of the IID used number counter 208 is equal to "the maximum value MAX−N", the decode stage stall signal E30 is set to "1", thereby stalling the decode stage of the instruction to which the IID will be allocated next.

Figure 17:
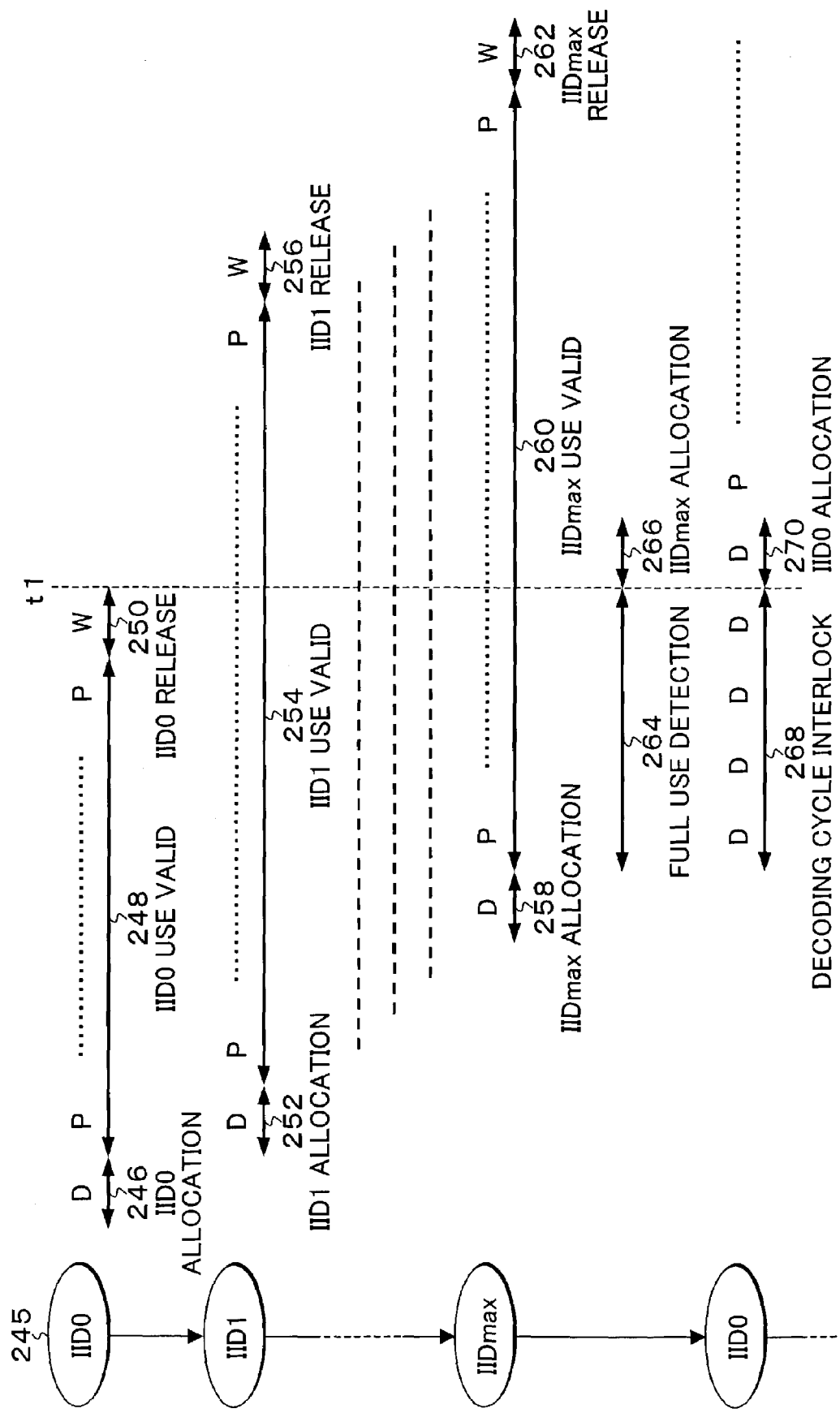
FIG. 17 is a time chart for allocation of instruction identifiers in an ordinary instruction execution and a forming state of a signal in each section in FIG. 16.

FIG. 17 is a time chart for allocation of the instruction ID in the ordinary instruction execution and a forming state of the signal in each section in FIG. 16. According to the time chart, the allocation of the instruction IDs is shown as "IID0, IID1, . . . , IIDmax, IID0" in the vertical direction at the left edge. The operations of the instructions are shown by the decoding cycle D, priority cycle P, and writing cycle W in the lateral direction in correspondence to the allocation of the respective instruction IDs. If an instruction ID0 is allocated like a process 246 in the decoding cycle D in the first instruction, use of IID0 is validated like a process 248 in the next priority cycle P and IID0 is released by the commitment of the instruction by the writing cycle W of a process 250. With respect to the next instruction, IID1 is allocated in the decoding cycle D of a process 252, use of IID1 is validated in the priority cycle P of a process 254 and IID1 is released by the commitment of the instruction by the writing cycle W of a process 256. In a manner similar to the above, IIDs are sequentially allocated in the decoding cycle with respect to each instruction. It is now assumed that IIDmax of the maximum number MAX has been allocated in the decoding cycle D of a process 258. In the priority cycle P of a process 260 subsequent to the process 258, the IID used number counter 208 is set to the maximum value MAX until IID0 allocated first at time t1 is released. Therefore, the full use detection signal (Z) from the full use detecting unit 238 in FIG. 16 is set to "1" and by setting the decode stage stall signal E30 to "1", on the basis of the full use detection of a process 264, with regard to the next instruction to which IID0 will be allocated, the decoding cycle D is stalled by the decoding cycle interlock of a process 268 until IID0 is released at time t1. When IID0 is released at time t1 by the process 250, the released IID0 is allocated to the interlocked instruction and the operating cycle enters the decoding cycle D of a process 270.

FIG. 18 is a time chart for the allocation of instruction IDs in the instruction execution of the multiflow in the invention and a forming state of the signal in each section in FIG. 16. IID allocation 271 to each section is shown in the vertical direction at the left edge. First, in the decoding cycle D serving as a process 272 of the previous flow with respect to the compare and swap instruction as shown in FIG. 15 as a target, IID0 is allocated and use of IID0 is validated in the priority cycle P of a next process 274. The previous flow is committed at time t1 of the writing cycle W of a process 276 and IID0 is released. When the previous flow is committed at time t1, the set signal E10 is inputted to the valid signal forming unit 234 in FIG. 16, the valid signal (X) is set to "1", and the valid signal is formed like a process 278 in FIG. 18. IID1 is allocated in the decoding cycle D of a process 280 to the following flow subsequent to the previous flow. IID1 is changed to the same IID0 as that of the previous flow by the emulation. Subsequently, in the priority cycle P of a process 282, use of IID1, that is, use of emulated IID0 is validated and IID1 is released by the commitment at time t2 due to the writing cycle W of a process 284. Subsequently, instruction control is sequentially performed with respect to the following instructions. In the decoding cycle D of a process 286 in which the IID used number counter 208 indicates the maximum number MAX, IIDmax is allocated and use of it is validated in the priority cycle P of a process 288. At this time, the fact that the used number of the IID used number counter 208 has reached the maximum number MAX is detected by the full use detecting unit 238 in FIG. 16. By setting the full use detection signal (Z) to "1", the full use detection of a process 292 in FIG. 18 is performed. Therefore, the decode stage stall signal E30 from the NAND gate 244 in FIG. 16 is set to "1". The instruction to which IID0 in FIG. 18 will be allocated next is interlocked by a process 298, thereby stalling the decoding cycle D. When the instruction ID0 allocated to the previous flow is released at time t1, although the full use detection of the process 292 is cancelled, the fact that the counter value is equal to "MAX−N=MAX−1" is detected by the counter value discriminating unit 236 in FIG. 16, and the counter value discrimination signal (Y) is set to "1". Therefore, the use detection of the counter value "MAX−1" is executed at time t1 like a process 294. At this time, since the valid signal (X) is also equal to "1" due to the creation of the valid signal of the process 278, the decode stage stall signal E30 from the NAND gate 244 in FIG. 16 is set to "1". The instruction to which IID0 will be allocated next is further interlocked in the decoding cycle like a process 300, thereby stalling the decoding cycle until time t2 when the following flow is committed. Therefore, even if IID0 allocated to the previous flow is released at time t1, the allocation of the instruction ID0 is stopped by the stall of the decoding cycle of another instruction to which IID0 will be allocated next, and the instruction ID0 allocated to the previous flow can be guaranteed until time t2 when the following flow is committed. When the following flow is committed at time t2, the interlocking process 300 of the decoding cycle is cancelled since the decode stage stall signal E30 is set to "0". IID0 allocated to the released previous flow can be newly allocated by a process 302. The IID allocated to the previous instruction developed to such a multiflow is certainly stored until the commitment of the following flow and the data upload to the following flow can be guaranteed without using the dedicated register for storing IID of the previous flow.

According to the invention as mentioned above, in the processor for executing the dynamic pipeline scheduling, when the previous flow and the following flow are internally developed into the multiflow and the instruction operation is executed, the register on the register update buffer used for the register renaming is used without providing the dedicated register which is used for forward-controlling the execution result of the previous flow to the following flow, and this allocation register is released by the commitment of the previous flow. However, another instruction to which the register of the previous flow will be allocated next is forcedly stalled for a period of time from the commitment of the previous flow to the commitment of the following flow, so that even if the register on the register update buffer which is released by the commitment of the previous flow is allocated, the register storage data is guaranteed until the commitment of the following flow. The execution result of the previous flow can be certainly forwarded to the following flow. Since the dedicated register is not provided, the resources of the processor can be saved.

According to another embodiment of the invention, even if the instruction ID which is allocated to the previous flow is released by the commitment when it is developed into the multiflow, by guaranteeing the instruction ID of the previous flow until the commitment of the following instruction, the forward control to the following flow using the instruction ID can be certainly performed. Since the dedicated register is unnecessary for the instruction ID, the resources of the processor can be saved.

In the above embodiment, the pixel distance instruction and the compare and swap instruction in the SPARC instruction architecture have been described as an example of the instruction such that one instruction is internally developed into a plurality of flows and the instruction operation is executed. However, the invention is not limited to such an example but can be also similarly applied to an instruction which is internally developed into a multiflow in a proper instruction architecture and the instruction operation is executed.

The invention incorporates many proper modifications without losing the objects and advantages of the invention. Further, the invention is not limited by the numerical values used in the embodiment.

What is claimed is:

1. A processor, comprising:
an instruction issuing unit which fetches and decodes an instruction, wherein, when a predetermined instruction is fetched and decoded, said instruction issuing unit develops said predetermined instruction operation into a multiflow including a previous flow and a following flow and said instruction issuing unit issues the instruction by an in-order process;
a reservation station which holds said issued instruction;
an instruction executing unit which executes the instruction held in said reservation station by an out-of-order process;
a committing unit which discriminates a commitment of the instruction executed by said instruction executing unit and completes the instruction by the in-order process;
a multiflow guarantee processing unit which guarantees an execution result of the previous flow by said instruction executing unit until the following flow is committed after the previous flow was committed by providing a register file, including a register undate buffer to store a plurality of register values as allocated registers, to transfer the execution result between multiflows, and said multiflow guarantee processing unit inhibits release of an execution result in an allocated register until said following flow is committed; and a renaming processing unit which renames a register used by a plurality of instructions having a dependent relationship, allocates the renamed register onto the register update buffer, and releases the register allocated on the register update buffer in accordance with the commitment of the executed instruction by said committing unit.

2. A processor according to claim 1, wherein said multiflow guarantee processing unit comprises:

a valid signal forming unit which outputs a valid signal (X) that is turned on for a period of time from the commitment of the previous flow to the commitment of the following flow;

a counter value discriminating unit which detects that a counter for counting a number of the allocated registers on said register update buffer indicates a counter value (MAX-N) obtained by subtracting the number of flows (N) from a maximum value MAX, and outputs a counter value discrimination signal (Y) that is turned on in response to such detection;

a buffer-full detecting unit which detects that said counter indicates the maximum value, and outputs a buffer-full signal (Z) that is turned on in response to such detection; and a logic arithmetic operating unit which forms a logic signal indicative of an OR of a result of an AND of said valid signal (X) and said counter value discrimination signal (Y) and said buffer-full signal (Z) and stalls the decoding cycle in said instruction issuing unit while said logic signal is ON.

3. A processor according to claim 2, wherein said instruction executing unit stores the execution result of said previous flow into the register file and forwards the execution result stored in the register file at the start of the execution of the following flow.

4. An instruction control method of a processor, comprising:

issuing an instruction wherein, when a predetermined instruction is fetched and decoded, an instruction operation is developed into a multiflow including a previous flow and a following flow and said instruction is issued by an in-order process;

holding an instruction, wherein said issued instruction is held into a reservation station;

executing an instruction, wherein the instruction held in said reservation station is executed by an out-of-order process;

committing an instruction, wherein a commitment of the instruction executed in said executing is discriminated and completed by the in-order process; and guaranteeing a multiflow, wherein an execution result of the previous flow by said instruction executing is guaranteed until the following flow is committed after the previous flow was committed by providing a register file, including a register update buffer to store a plurality of register values as allocated registers, to transfer an execution result between multiflows, and inhibiting release of an execution result in an allocated register until said following flow is committed; and renaming, wherein a register that is used by a plurality of instructions having a dependent relation is renamed and allocated onto said register update buffer and the register allocated on said register update buffer is released in accordance with the commitment of the executed instruction by said committing.

5. A method according to claim 4, wherein said guaranteeing comprises:

forming a valid signal, wherein a valid signal (X) that is turned on for a period of time from the commitment of the previous flow to the commitment of the following flow is outputted;

discriminating a counter value, wherein it is detected that a counter for counting a number of the allocated registers on said register update buffer indicates a counter value (MAX-N) obtained by subtracting the number of flows (N) from a maximum value MAX, and a counter value discrimination signal (Y) that is turned on in response to such detection is outputted;

detecting a full buffer, wherein it is detected that said counter indicates the maximum value, and a buffer-full signal (Z) that is turned on in response to such detection is outputted; and operating logic arithmetic, wherein a logic signal indicative of an OR of an arithmetic operation result of an AND of said valid signal (X) and said counter value discrimination signal (Y) and said buffer-full signal (Z) is formed and the decoding cycle in said instruction issuing step is stalled while said logic signal is ON.

6. A method according to claim 5, wherein in said executing, the execution result of said previous flow is stored into the register file and the execution result stored in said register file is forwarded at the start of the execution of the following flow.

7. A processor, comprising:

an instruction issuing unit which, when a predetermined instruction is fetched and decoded, develops an instruction operation into a multiflow, including a previous flow and a following flow, adds a unique instruction identifier to every instruction flow, and issues the instruction by an in-order process;

a reservation station which holds said issued instruction;

an instruction executing unit which executes the instruction held in said reservation station by an out-of-order process;

a committing unit which discriminates a commitment of the instruction executed by said instruction executing unit and completes the instruction by the in-order process;

a multiflow guarantee processing unit which guarantees the instruction identifier of said previous flow until the following flow is committed by providing a register file including a register update buffer to store a plurality of register values as allocated registers, to transfer an execution result between multiflows, and said multiflow guarantee processing unit inhibits release of an execution result in an allocated register until said following flow is committed; and a renaming processing unit which renames a register that is used by a plurality of instructions having a dependent relationship, allocates the renamed register onto the register update buffer, and releases the register allocated on the register update buffer in accordance with the commitment of the executed instruction by said committing unit.

8. A processor according to claim 7, wherein said instruction issuing unit emulates the instruction identifier allocated to the following flow to the same instruction identifier as that of the previous flow, and at the start of the instruction operation of the following flow, refers to an execution result of the previous flow by said emulated instruction identifier and forwards it.

9. A processor according to claim 7, wherein said multiflow guarantee processing unit comprises:
- a valid signal forming unit which outputs a valid signal (X) that is turned on for a period of time from a commitment of the previous flow to the commitment of the following flow;
- a counter value discriminating unit which detects that a counter for counting a number of said the allocated instruction identifiers indicates a counter value (MAX-N) obtained by subtracting the number of flows (N) from a maximum value MAX, and outputs a counter value discrimination signal (Y) that is turned on in response to such detection;
- a buffer-full detecting unit which detects that the counter indicates the maximum value, and outputs a buffer-full signal (Z) which is turned on in response to such detection; and
- a logic arithmetic operating unit which forms a logic signal indicative of an OR of an arithmetic operation result of an AND of said valid signal (X) and said counter value discrimination signal (Y) and said buffer-full signal (Z) and stalls the decoding cycle in said instruction issuing unit while said logic signal is ON.

10. A processor according to claim 9, wherein said instruction executing unit stores state code data obtained as an execution result of said previous flow into a commit stack entry of the previous flow, upon decoding of the following flow, selectively executes the instruction operation of the following flow with reference to said state code data in said commit stack entry of said previous flow.

11. An instruction control method of a processor, comprising:
- issuing an instruction, wherein, when a predetermined instruction is fetched and decoded, an instruction operation is developed into a multiflow, including a previous flow and a following flow, a unique instruction identifier is added every instruction flow, and the instruction is issued in-order;
- holding, wherein said issued instruction is held into a reservation station;
- executing an instruction, wherein the instruction held in said reservation station is executed by an out-of-order process;
- committing, wherein a commitment of the instruction executed in said executing is discriminated and completed in-order;
- guaranteeing a multiflow, wherein said instruction identifier of said previous flow is guaranteed until the following flow is committed by providing a register file, said register file including a register update buffer to store a plurality of register values as allocated registers, to transfer the instruction identifier between multiflows, and inhibiting release of an instruction identifier in an allocated register until said following flow is committed; and
- renaming, wherein a register that is used by a plurality of instructions having a dependent relation is renamed and allocated onto said register update buffer and the register allocated on said register update buffer is released in accordance with the commitment of the executed instruction by said committing.

12. A method according to claim 11, wherein in issuing said instruction, the instruction identifier allocated to the following flow is emulated to the same instruction identifier as that of the previous flow, and at the start of the instruction operation of the following flow, an execution result of the previous flow is referred to by said emulated instruction identifier and forwarded.

13. A method according to claim 11, wherein said guaranteeing a multiflow comprises:
- forming a valid signal, wherein a valid signal (X) that is turned on for a period of time from the commitment of the previous flow to the commitment of the following flow is outputted;
- discriminating a counter value, wherein it is detected that a counter for counting a number of said the allocated instruction identifiers indicates a counter value (MAX-N) obtained by subtracting the number of flows (N) from a maximum value MAX, and a counter value discrimination signal (Y) that is turned on in response to such detection is outputted;
- detecting a full buffer, whereby it is detected that said counter indicates the maximum value, and a buffer-full signal (Z) which is turned on in response to such detection is outputted; and
- operating logic arithmetic, wherein a logic signal indicative of an OR of an arithmetic operation result of an AND of said valid signal (X) and said counter value discrimination signal (Y) and said buffer-full signal (Z) is formed and the decoding cycle in said instruction issuing unit is stalled while said logic signal is ON.

14. A method according to claim 13, wherein in said executing, state code data obtained as an execution result of said previous flow is stored into a commit stack entry of the previous flow, and upon decoding of the following flow, the instruction operation of the following flow is selectively executed with reference to said state code data in said commit stack entry of said previous flow.

15. A processor, comprising:
- a controller,
    - fetching, decoding and issuing a plurality of instructions;
    - developing at least a first instruction flow and a second instruction flow and allocating a location in a register file, including a register update buffer to store a plurality of register values as allocated registers, when an instruction which must be internally multiflow developed into a plurality of instruction flows is fetched;
    - renaming a register used by a plurality of instructions having a dependent relationship and allocating the renamed onto the register update buffer;
    - executing said plurality of instructions by an out-of order process;
    - committing said plurality of instructions by an in-order process;
    - guaranteeing an execution result of the instruction which must be internally multiflow developed into a plurality of instructions flows, by using said register file to transfer the execution result between instruction flows and inhibiting a release of an execution result in an allocated register until said second instruction flow is committed.

* * * * *

UNITED STATES PATENT AND TRADEMARK OFFICE
CERTIFICATE OF CORRECTION

PATENT NO. : 7,287,150 B2
APPLICATION NO. : 10/347337
DATED : October 23, 2007
INVENTOR(S) : Toshio Yoshida It is certified that error appears in the above-identified patent and that said Letters Patent is hereby corrected as shown below:

Column 18, Line 65, change "undate" to --update--.

Column 22, Line 52-53, change "out-of order" to --out-of-order--.

Signed and Sealed this

Sixth Day of May, 2008

JON W. DUDAS
*Director of the United States Patent and Trademark Office*